(12) United States Patent
Kriger

(10) Patent No.: US 10,988,095 B2
(45) Date of Patent: Apr. 27, 2021

(54) ADAPTIVE MULTI-FORCE SAFETY SYSTEM (ADMUS)

(71) Applicant: Yefim G. Kriger, Ansonia, CT (US)

(72) Inventor: Yefim G. Kriger, Ansonia, CT (US)

( * ) Notice: Subject to any disclaimer, the term of this patent is extended or adjusted under 35 U.S.C. 154(b) by 0 days.

(21) Appl. No.: 16/859,505

(22) Filed: Apr. 27, 2020

(65) Prior Publication Data

US 2020/0339056 A1  Oct. 29, 2020

Related U.S. Application Data

(60) Provisional application No. 62/920,333, filed on Apr. 26, 2019.

(51) Int. Cl.
| | |
|---|---|
| *B60R 21/015* | (2006.01) |
| *B60R 21/017* | (2006.01) |
| *B60R 21/16* | (2006.01) |
| *B60R 21/0134* | (2006.01) |

(52) U.S. Cl.
CPC ...... *B60R 21/01556* (2014.10); *B60R 21/017* (2013.01); *B60R 21/0134* (2013.01); *B60R 21/01516* (2014.10); *B60R 21/01538* (2014.10); *B60R 21/16* (2013.01); *B60R 2021/162* (2013.01)

(58) Field of Classification Search
CPC ........ B60R 21/01556; B60R 21/01516; B60R 21/01538; B60R 21/0134; B60R 21/017; B60R 21/16; B60R 2021/162
See application file for complete search history.

(56) References Cited

U.S. PATENT DOCUMENTS

| | | | |
|---|---|---|---|
| 5,515,933 A | 5/1996 | Meyer et al. | |
| 5,564,743 A | 10/1996 | Marchant | |
| 5,763,837 A | 6/1998 | Davignon et al. | |
| 5,986,221 A | 11/1999 | Stanley | |
| 6,026,340 A * | 2/2000 | Corrado ................ | B60N 2/002 280/735 |
| 6,076,853 A | 6/2000 | Stanley | |

(Continued)

OTHER PUBLICATIONS

At CES (Consumer Electronics Show) 2018, Ford launches a cloud-based platform for mobility services and announces collaboration with Qualcomm on C-V2X by Teena Maddox, Jan. 9, 2018.

(Continued)

*Primary Examiner* — Stephen Holwerda
(74) *Attorney, Agent, or Firm* — Chris Boehm; Cantor Colburn LLP

(57) ABSTRACT

An on-board vehicle system including: an electronic computing and control unit connected to vehicle internal sensors and to a vehicle main computer, which in turn is connected to crash sensing related sensors and vehicle driving sensors, and the electronic computing and control unit is also operatively connected to an occupant weighing devices of the on-board vehicle system connected to seats of passengers which are operatively connected to inflators through controllers which are connected to electronic computing and control unit by using a method of occupant weighing, and wherein a restraint power line of an air bag of a child seat is connected to a low pressure air bag source which is connected to and controlled by the electronic computing and control unit.

14 Claims, 4 Drawing Sheets

(56) References Cited

U.S. PATENT DOCUMENTS

| | | | |
|---|---|---|---|
| 6,181,996 B1 | 1/2001 | Chou et al. | |
| 6,242,701 B1 | 6/2001 | Breed et al. | |
| 6,345,839 B1 | 2/2002 | Kuboki et al. | |
| 6,448,890 B1 | 9/2002 | Cooper | |
| 6,463,372 B1* | 10/2002 | Yokota | B60N 2/2821 280/801.1 |
| 6,585,328 B1 | 7/2003 | Oexman et al. | |
| 6,649,848 B2 | 11/2003 | Kriger | |
| 6,816,807 B2 | 11/2004 | Kriger | |
| 7,134,715 B1 | 11/2006 | Fristedt et al. | |
| 7,330,784 B2 | 2/2008 | Johnson et al. | |
| 7,465,272 B2 | 12/2008 | Kriger | |
| 7,774,212 B2 | 8/2010 | Huang et al. | |
| 7,803,111 B2 | 9/2010 | Kriger | |
| 7,910,840 B2 | 3/2011 | Chai | |
| 8,388,532 B2 | 3/2013 | Morgan | |
| 8,417,422 B2 | 4/2013 | Choi et al. | |
| 8,493,079 B2 | 7/2013 | Petereit et al. | |
| 8,552,661 B2 | 10/2013 | Kriger | |
| 9,492,120 B2 | 11/2016 | Horseman | |
| 9,526,455 B2 | 12/2016 | Horseman | |
| 9,566,877 B2 | 2/2017 | Kriger | |
| 9,710,788 B2 | 7/2017 | Horseman | |
| 9,949,640 B2 | 4/2018 | Horseman | |
| 10,017,078 B2 | 7/2018 | Kriger | |
| 10,131,308 B2 | 11/2018 | Kriger | |
| 10,245,973 B2 | 4/2019 | Kriger | |
| 2001/0033074 A1 | 10/2001 | Aoki et al. | |
| 2002/0003344 A1 | 1/2002 | Maeda | |
| 2003/0042051 A1 | 3/2003 | Kriger | |
| 2003/0130595 A1 | 7/2003 | Mault | |
| 2004/0148127 A1 | 7/2004 | Kriger | |
| 2005/0011682 A1* | 1/2005 | Murphy | B60R 21/0152 177/144 |
| 2005/0101875 A1 | 5/2005 | Semler et al. | |
| 2005/0194192 A1 | 9/2005 | Kriger | |
| 2005/0283292 A1* | 12/2005 | Kawato | B60N 2/42745 701/45 |
| 2006/0151227 A1* | 7/2006 | Reith | B60R 21/0154 180/273 |
| 2006/0217864 A1 | 9/2006 | Johnson et al. | |
| 2007/0185391 A1 | 8/2007 | Morgan | |
| 2007/0244375 A1 | 10/2007 | Jenkins et al. | |
| 2008/0046152 A1 | 2/2008 | Ohtake et al. | |
| 2008/0046291 A1 | 2/2008 | Huang et al. | |
| 2008/0054690 A1* | 3/2008 | Inayoshi | B60R 21/0152 297/216.1 |
| 2008/0093143 A1 | 4/2008 | Harrison | |
| 2008/0179110 A1 | 7/2008 | Chai | |
| 2008/0246318 A1* | 10/2008 | Bothe | B60R 16/037 297/217.3 |
| 2008/0294370 A1 | 11/2008 | Kriger | |
| 2009/0132099 A1 | 5/2009 | Kriger | |
| 2009/0182204 A1 | 7/2009 | Semler et al. | |
| 2009/0314556 A1 | 12/2009 | Harris et al. | |
| 2010/0138078 A1 | 6/2010 | Choi et al. | |
| 2010/0302022 A1* | 12/2010 | Saban | B60N 2/002 340/459 |
| 2010/0327638 A1 | 12/2010 | Petereit et al. | |
| 2011/0096558 A1 | 4/2011 | Kriger | |
| 2011/0183870 A1 | 7/2011 | Pan | |
| 2012/0312604 A1 | 12/2012 | Fujii | |
| 2013/0011819 A1 | 1/2013 | Horseman | |
| 2013/0012786 A1 | 1/2013 | Horseman | |
| 2013/0012790 A1 | 1/2013 | Horseman | |
| 2013/0013327 A1 | 1/2013 | Horseman | |
| 2013/0117040 A1 | 5/2013 | James | |
| 2013/0218487 A1 | 8/2013 | Fujii et al. | |
| 2014/0163333 A1 | 6/2014 | Horseman | |
| 2014/0239980 A1 | 8/2014 | Ootaka | |
| 2014/0275834 A1 | 9/2014 | Bennett | |
| 2014/0353048 A1* | 12/2014 | Kriger | A61B 5/6893 177/1 |
| 2016/0096498 A1 | 4/2016 | Kubota | |
| 2016/0107596 A1 | 4/2016 | Park | |
| 2016/0163319 A1 | 6/2016 | Parundekar et al. | |
| 2017/0267197 A1 | 9/2017 | Kriger | |

OTHER PUBLICATIONS

Autoliv staffs up for leap into autonomous. Big move starts with an engineer surge. Automotive News. by David Sedgwick . Sep. 19, 2016.

Automobile Brakes Tutorial downloaded from Carparts website Apr. 12, 2016.

Consumer Electronic Show. Press release . 3GPP Release 14 Cellular-V2X Technology Field Trial in Germany. Jan. 3, 2017 Las Vegas.

C-V2X offers a cellular alternative to IEEE 802.11p/DSRC , by Sam Lucero Senior Principal Analyst, M2M and IoT. Jun. 9, 2016.

Development of occupant classification system. Tsutomu Takano, Nissan Motor Co., LTD 18 International ESV conference, Nagoya, May, 2003. Paper No. 206.

General Motors, Gazing at Future, Invests $500 Million in Lyft. By Mike Isaacjan. 4, 2016 . New York Times.

Guo et al. "Predicting overweight and obesity in adulthood from body mass index values in childhood and adolescence 1-3" 2002.

Magarey et al. "Predicting obesity in early adulthood from childhood and parental obesity" 2003.

NHTSA . A Notice of Proposed Rulemaking (NPRM) in 2016. 49 CFR Part 571 RIN 2127-AL55 Federal Motor Vehicle Safety Standards.

NHTSA, "Driver assistance technologies". Jan. 2018.

Notice of Proposed Rulemaking. DOT of transportation NHTSA. 49 CFR Part 571 RIN 2127-AL55 NHTSA 2016.

Nyhol et al. "The Validity of Obesity Based on Self-reported Weight and Height: Implications for Population Studies" 2007.

Pre-crash Sensing—Functional Evolution based on Short Range Radar Sensor Platform, by Rainer Moritz , Robert Bosch Gmbh. Copyright © 2000 Society of Automotive Engineers, Inc. 00IBECD-11.

Pre-crash sensing countermeasures and benefits, by Ron Pack, Jonathan Koopmann, Hailing Yu, Wassim G. Najm. Proceedings of the 19th Conference ESV 2005. Paper No. 05-0202.

Qualcomm to Acquire NXP Semiconductors for $38.5 Billion, by Chad Bray and Quentin Hardy. New York Times. Oct. 27, 2016.

Servo Database—RC Servo Specs and Reviews (https://servodatabase.com/).

Tesla's Autopilot: The smart person's guide. By Hope Reese, TechRepublic , Aug. 4, 2017.

The Race for Self-Driving Cars. By Guilbert Gates New York Times, Jun. 6, 2017.

Traffic safety facts. 2016 data. DOT HS 812494. Feb. 2018. NHTSA.

Volvo's autonomous Drive Me project kicks off in Sweden. Road/Show. Car Industry, by Andrew Krok. Sep. 12, 2016.

Waymo Safety Report. On the Road to Fully Self-Driving. 2017.

\* cited by examiner

ADAPTIVE MULTI-FORCE SAFETY SYSTEM (ADMUS)

CROSS REFERENCE TO RELATED APPLICATIONS

This application claim priority to U.S. provisional application Ser. No. 62/920,333 filed on Apr. 26, 2019, the entire contents of which is incorporated herein by reference thereto.

This following applications and/or patents are also incorporated herein by reference thereto: U.S. patent application Ser. No. 15/430,219 filed on Feb. 10, 2017, now U.S. Pat. No. 10,245,973 which issued on Apr. 2, 2019 which is a divisional of U.S. patent application Ser. No. 14/282,715 filed on May 20, 2014 now U.S. Pat. No. 9,566,877 which issued on Feb. 14, 2017 and claims priority to U.S. Provisional Application No. 61/956,059 filed on May 30, 2013, the contents each of which are incorporated herein in their entirety by reference thereto.

This following applications and/or patents are also incorporated herein by reference thereto: U.S. application Ser. No. 15/463,352 filed on Mar. 20, 2017, now U.S. Pat. No. 10,131,308 which issued on Nov. 20, 2018 and claims priority to U.S. Provisional Application No. 62/390,063 filed on Mar. 18, 2016, the contents each of which are incorporated herein in their entirety by reference thereto.

BACKGROUND

Practically all American cars are equipped by safety systems such as Supplemental Restraint System (SRS) comprising an air bag. For example, a front air bag restraint system has an air bag, which is deployable between an instrument panel and an occupant seat within an automotive vehicle. When the vehicle includes an occupant safety restraint device arranged to protect the occupant during a crash involving the vehicle, it can be coupled to the weight measuring system and arranged to provide a variable deployment depending on the determined weight of the occupant. During a crash event, the vehicle's crash sensor and other sensors provide crucial information to the air bag Electronic Computing and Control Unit (ECU), including weight and position of an occupant, usage of the seat belt, severity of impact, etc. Using this information, the air bag ECU's crash algorithm determines if the crash event meets the criteria for air bag deployment and triggers various firing circuits to deploy one or more air bag modules within the vehicle. Working as a supplemental restraint system to the vehicle's seat belt system, air bag module deployments are triggered through a pyrotechnic process that is designed to be used once. The signals from the various sensors are fed into the air bag ECU, which determines from them the position of the vehicle occupant, the severity or force of the crash, along with other variables.

To improve safety of passengers in case of a possible crash, adaptive and advanced duel-depth air bag systems and according to them the Passenger Classification Systems were designed. Adaptive air bag systems may utilize multi-stage air bags to adjust the pressure within the air bag. The greater the pressure within the air bag, the more force the air bag will exert on the occupants as they come in contact with it. These adjustments allow the system to deploy the air bag with a moderate force for most collisions, reserving the maximum force air bag only for the severest of collisions. Additional sensors to determine the location, weight or relative size of the occupants may also be used.

Information regarding the occupants and the severity of the crash are used by the air bag control unit, to determine whether air bags should be suppressed or deployed, and if so, at various calculated output levels.

In the advanced duel-depth air bag, the first and second chambers of the air bag are selectively pressurized with a gaseous fluid. The valve member is operable to distribute the pressurized fluid to one chamber, both of the chambers of the air bag, or to the atmosphere. The design of the advanced duel-depth air bag system shows that the car manufacturers try to improve the vehicle occupant safety employing the Passenger Classification System [1] by multiplying the number of chambers of an air bag.

As an example, according to Passenger Classification System, the air bag in the advanced duel-depth air bag system is deployed at either at a high force level, a less forceful level, or not at all, as following:

45 pounds or less was relayed as an infant or toddler. In this category, the air bag was automatically shut off and would not deploy. 46-108 pounds was relayed as a child or small adult. In this category, depending on the severity of the crash, the low side of the air bag may have been deployed.

109 pounds and above was considered a full size adult. In this category, depending on all other factors, the high side of the air bag may have been deployed.

The present invention relates to methods and apparatuses to prevent and mitigate the results of an imminent vehicle collision on the road by preventing fatalities as well as injuries that may be caused by the extra force applied to the occupant's body or other reason explained further in the event of a collision. More particularly, the present invention relates to new methods of accurate weighing occupants of vehicle that provides elimination of obstacles to improve safety of the vehicles' occupants in the event of a collision.

The problem of vehicle occupant safety has now become a nation-wide problem for the USA and other countries.

The air bag by itself may cause injuries if doesn't work properly. From 1990 to 2000, the United States National Highway Traffic Safety Administration (NHTSA) identified 175 fatalities caused by air bags. Most of these (104) have been children, while the rest were adults. 262 deaths from 1990 to 2006 reportedly have been caused by air bags inflating in low severity crashes, most of them in older model vehicles. These deaths include 87 drivers, 13 adult passengers, 138 children, and 24 infants. In 2016 alone, 37,461 people died in motor vehicle crashes. In 2016 publication [2], NHTSA provided overall crash population for a period of 2010-2013.

Today's cars and trucks come with driver assistance technologies. For several years, vehicles have come with cameras and sensors that help drivers and warn of a possible collision. The present disclosure relates to the field of the vehicles of both types in which drivers have or not have assistance from different on-board devices that help safety driving. Such devices as the backup camera provide the driver with a better view behind the vehicle or automatically park a vehicle. Another one warns a driver when a vehicle is drifting out of its lane and will automatically steer the vehicle back into its lane if the driver will not react. These and other driver assistance technologies that include sensors, radars, cameras, GPS will help support Automated Driving Systems (ADS),

TABLE 1

| | 2010-2013 Annually | | | | 2010-2013 total costs | |
|---|---|---|---|---|---|---|
| | Crashes | Fatalities | 1-5 Injuries | Property damage | Costs for society | Total costs |
| 1 | | | Registered crashes for all vehicles | | | |
| | 5.5M | 33,020 | 2.7M | 6.3M | $195 B | $721 B |
| 2 | | Related to the V2V technology (2 cars crashes - 69%) | | | | |
| | 3.8M | 13,329 | 2.1M | 5.2M | | |
| 3 | For LV2LV vehicles only (62% of all crashes) - that a new technology may save | | | | | |
| | 3.4M | 7,325 | 1.8M | 4.7M | $109 B | $319 B |
| 4 | Crashes and their results that will be not covered by the V2V technology | | | | | |
| | 2.1M | 25,695 | 0.9M | 1.6M | $86 B | $402 B | more commonly referred to as "self-driving" [3] (SDV) or autonomous vehicles. These 2 type of vehicles in contrast to the contemporary vehicles might be able to take over all aspects of driving and may predict imminent crashes on the road and reduce vehicle crashes and resulting fatalities and injuries. The Table 1 was generated by this data.

In the row 1 of the Table 1, is given the data published by NHTSA. Based on 2010-2013 General Estimates System (GES) and Fatality Analysis Reporting System (FARS), of the 5.5 million annually crashes, which would translate to 33,020 fatalities, 2.7 million Maximum Abbreviated Injury Scale (MAIS) 1-5 injuries, and 6.3 million property damage only vehicles (PDOVs). NHTSA estimated that safety applications enabled by self-driving technology could eliminate or mitigate the severity of up to 80 percent of crashes, including crashes at intersections or while changing lanes. Most of the automobile companies, technology companies, component makers, and organizations have begun developing or forming partnerships around self-driving technology to decrease the number of crashes, fatalities, and injuries on the roads A handful have invested sizable resources as they try to become leaders in autonomous driving. For example, Google, one of the early attention-getters [4], spun off its autonomous car project into the new company called Waymo, signaling that it's close to being commercialized.

General Motors [5]invested $500 million in the start-up company Lyft and has announced that it would test self-driving electric taxis on public roads within a year. It bought Cruise Automation for about $1 billion, and planned to build a development center in San Francisco.

Several large automakers, including Ford and Toyota, have announced big plans for moving attention and resources towards the development of Artificial Intelligent (A) Project, which is used to enable autonomous driving.

Volvo company [6] started a pilot project to trial autonomous SUV in Sweden and expand a trial later to London and China.

Autoliv, the world's largest airbag supplier [7] is in a joint venture with Volvo to develop self-driving cars.

Qualcomm company [8] has been working on systems that allow cars to automatically communicate location information. It is acquiring NXP Semiconductors, a maker of automotive microelectronic equipment, for a deal valued at $47 billion.

At CES (Consumer Electronics Show) 2018, [9] Ford launched a cloud-based platform for mobility services and announced collaboration with Qualcomm on C-V2X. Ford is focusing on improving mobility in cities and has a new model for autonomous vehicles as well as a new open platform to facilitate information flow between vehicles.

Some states currently have specific laws that would ban autonomous driving—New York State, for instance, does not allow any hands-free driving. Without clear regulations, testing self-driving cars is a challenge. Alabama, Arkansas, California, Colorado, Connecticut, Florida, Georgia, Louisiana, Michigan, New York, Nevada, North Carolina, North Dakota, Pennsylvania, South Carolina, Tennessee, Texas, Utah, Virginia, and Vermont and Washington D.C. have all passed legislation related to autonomous vehicles, as of August 2017.

At this point, there are some proposed or/and realized technologies employed in the SDV to make driving vehicles safer. Let us discuss several of them.

NHTSA issued [10] an advance notice of proposed rulemaking (ANPRM) and a research report, "Vehicle-to-Vehicle Communications: Readiness of V2V Technology for Application," which explores technical, legal, and policy issues associated with V2V communication system for use in the self-driving or automatic/autonomous vehicles V2V use the dedicated short range communications (DSRC) to transmit data, such as location, direction and speed to nearby vehicles. That data would be updated and broadcast up to 10 times per second to nearby vehicles. Vehicle-to-Infrastructure (V2I) communications will allow vehicles to "talk" to roadway infrastructure such as traffic lights, stop signs, and work zones.

DSRC-based devices can be installed directly in vehicles when originally manufactured, after initial manufacture via an "aftermarket" installation, or could potentially be carried into vehicles by drivers in the form of a handheld device (and perhaps eventually, even as a function on a smart phone).

V2V messages have a range of approximately 300 meters. NHTSA's analysis of two potential applications, "intersection movement assist" (IMA) and "left turn assist" (LTA), indicated there could be a 50-percent reduction, on average, in crashes, injuries, and fatalities for just these two applications.

A basic safety message (BSM) is exchanged between vehicles and contains vehicle dynamics information such as heading, speed, location. The BSM is updated and broadcast up to 10 times per second to surrounding vehicles. The information is received by the other vehicles equipped with V2V devices and processed to determine collision threats.

In the row 1 of the Table 1, some vehicle crashes involve only one vehicle that would not be covered by the V2V technology, and therefore the saved crash population (see row 2) by the V2V technology encompasses approximately 3.8 million (69 percent of all crashes) vehicle-to-vehicle crashes, which would translate to 13,329 fatalities, 2.1 million MAIS 1-5 injuries, and 5.2 million PDOVs. As the V2V technology is currently limited only to light vehicles, the crash population (see row 3) encompasses approximately 3.4 million (62 percent of all crashes) light-vehicle to light-vehicle (LV2LV) saved crashes. It would translate to 7,325 fatalities, 1.8 million MAIS 1-5 injuries, and 4.7 million PDOVs. The economic and comprehensive total costs for these crashes amount to approximately $109 billion and $319 billion, respectively.

As we can see from row 4 of the Table 1 by comparing it to rows 1-3, the driver of a contemporary vehicle will be responsible during the next 8 years for 2.1 million crashes, 25,695 fatalities, and 0.9 million injuries annually because the V2V technology will save only 7,325 people annually in the possible 3.4 million crashes. This technology should also cover the crashes caused by poor weather conditions and condition of the vehicle parts. The V2V vehicles will be more complicated mechanically and electronically than the regular vehicles, and they may possibly contribute to some crashes. As evidenced by the above, the safety systems in the V2V vehicles has to be more advanced to satisfy the V2V technology.

Another proposed and realized Communication Technology employed in the SDV to make driving vehicles safer is the Tesla's hardware for self-driving model S electrical car. All Tesla vehicles Model 3 [11] have the hardware needed for self-driving capability at a safety level substantially greater than that of a human driver. It has active safety technologies, including automatic emergency braking. It has 8 air bags for driver and passenger heads, knees, and pelvis, plus two side curtain air bags. Tesla has an autonomous driving feature, called Autopilot that aims to assist drivers on highways through a system of radar, cameras, sensors, and GPS. Autopilot does not turn a Tesla into a driverless car. It is Tesla's autonomous driving feature that is designed to assist drivers on highways. Autopilot-enabled vehicles can automatically steer, change lanes, and apply brakes. For now, they still require a human behind the wheel. When used, Autopilot-enabled vehicles can self-steer, adjust speed, detect nearby obstacles, apply brakes, and park. Enhanced Autopilot 8.1, is applied to all Teslas made after Oct. 19, 2016. The GPS can detect the car's position. Additionally, the processor uses a Tesla-created AI (Artificial Intelligent) system for vision, sonar, and radar. Tesla's Automated Driving System (ADS) consists the Automatic Emergency Steering and Side Collision Warning: Side Collision Warning further enhances the active safety capabilities by sensing range and alerting drivers to objects, such as cars, that are too close to the side of the Tesla.

Another proposed and realized technology employed in the SDV to make driving vehicles safer is the Google based self-driving and automatic/autonomous vehicles technology. This technology is used by Waymo, the Google's parent company, in fully self-driving vehicles [12]. Waymo is a self-driving technology company with a mission to make it safe and easy for people and things to move around. Waymo's self-driving system is designed to perform the entire dynamic driving task within a geographic area, without the need for a human driver. Before their cars drive in any location, their team builds their own detailed three-dimensional maps that highlight information such as road profiles, curbs and sidewalks, lane markers, crosswalks, traffic lights, stop signs, and other road features. Waymo's vehicles cross-reference their pre-built maps with real time sensor data to precisely determine their location on the road. For every dynamic object on the road, software predicts future movements based on current speed and trajectory. It understands that a vehicle will move differently than a cyclist or pedestrian. The software then uses that information to predict the many possible paths that other road users may take. The software also takes into account how changing road conditions (such as a blocked lane up ahead) may impact the behavior of others around it. Because their vehicles are constantly monitoring the environment, and predicting the future behavior of other road users in 360 degrees around the vehicles, they're able to respond quickly and safely to any changes on the road. Waymo's self-driving system uses LiDAR (Light Detection and Ranging) System, Vision (Camera) System, Radar System, GPS, and Supplemental Sensors. LiDAR works by beaming of laser pulses in 360 degrees and measuring how long it takes to reflect off a surface and return to the vehicle and can see up to 300 meters away. The vision system includes cameras designed to see with a simultaneous 360-degree field of view. Because high-resolution vision system detects color, it can help spot traffic lights, construction zones, school buses, and the flashing lights of emergency vehicles. For crash safety of the passengers inside the vehicles there are airbags that mitigate injury or prevent death. Waymo's self-driving software makes sense of the information coming from the sensors, and uses that information to make the best driving decisions for each situation. Their self-driving software doesn't just detect the presence of other objects; it actually understands what an object is, how it's likely to behave, and how that should affect their vehicle's own behavior on the road. This is how their vehicles safely navigate roads in fully autonomous mode.

Another proposed possible technology to employ in the SDV to make driving vehicles safer is the cellular communication technology. The Cellular Vehicle-to-Everything (C-V2X) technology concept is briefly described in [13]. It involves the use of developing cellular standards for a wide range of vehicle connectivity use cases and applications. The C-V2X will facilitate vehicle-to-infrastructure (V2) and vehicle-to-network (V2N) communications, leveraging traditional cellular infrastructure. Messages can be broadcast from V2X servers to a number of vehicles simultaneously, while individual vehicles can send messages back to the server. Enabling V2I and V2N communications is beneficial because that makes possible a wide range of applications, such as the vehicle receiving alerts about accidents a few miles ahead up the road, or connecting to smart parking systems to find open available parking spaces automatically. On Consumer Electronic Show (CES) 2017 in Las Vegas, the companies AUDI, Ericsson, Qualcomm Technologies, Inc., a subsidiary of Qualcomm Incorporated, and SWARCO Traffic Systems, announced the formation of Connected Vehicle to Everything of Tomorrow (ConVeX)—a consortium to carry out the first announced Cellular-V2X (C-V2X) trial based upon the 3rd Generation Partnership Project's (3GPP) Release 14, which includes Vehicle-to-Everything (V2X) communication [14].

As we may see, all proposed and realized self-driving and autonomous vehicle technologies have some the same and some different basic qualities and characteristics. All of them might be able to take over all aspects of driving, which could reduce vehicle crashes and resulting fatalities and injuries. All of them have driver assistance technologies and might be able to take over all aspects of driving, which could reduce vehicle crashes and resulting fatalities and injuries. All of them are supported by Automated Driving Systems (ADS) that include such units as backup camera, system for preventing forward collision, a system that automatically steers the vehicle back into its lane, and a lot of sensors and equipment outside of the vehicle. The hardware of these units is well supported by the powerful and reserved software. As a result of their self-driving and/or autonomous nature, all such vehicles have a pre-crash sensitivity [15]

feature. All such vehicles have or will have information about and/or communication with different objects or subjects on the nearby part of the road such as other vehicles, pedestrians, cyclists, animals, traffic lights and signs, roadside infrastructure, construction zones, debris, and other obstacles.

From the other side, a protocol and technology of communication of the self-driving and autonomous vehicles may be different. To get information about the situation on the road, some self-driving and autonomous vehicles sense the area surrounding the vehicle by sending 360° signals around the vehicle and analyzing these signals reflected from any substance on the road [11]. Other vehicles sense the area surrounding the vehicle by not only sending signals-messages around the vehicle to the nearby vehicles, but also receiving and analyzing such signals-messages sent from any nearby vehicles on the road. For example, the V2V (vehicle-to-vehicle) communication technology [2].

At the same time, Ford [9] and AUDI [14] announced collaboration with Qualcomm on the Cellular Vehicle-to-Everything (C-V2X) technology concept involving the use of developing cellular standards for a wide range of vehicle connectivity instead of DSRC radio communication Standard.

Despite described differences, all proposed and realized self-driving and autonomous vehicles have basic qualities and characteristics that allow all of them to reduce vehicle crashes and, as it will be shown later, they have a good prospective for further decreasing fatalities and injuries in case of a crash.

As was shown previously, a vehicle may obtain its self-driving or autonomous feature by constantly measuring and controlling its own position and driving characteristics on a road and a dynamic of location of any nearby objects on the road.

As was mentioned previously, the Basic Safety Message (BSM) is used for vehicles communication in V2V communication system proposed by NHTSA for self-driving vehicles. Such vehicles use for safety purposes [3] Automated Driving Systems, for example, backup camera, system for preventing forward collision, a system that automatically steers the vehicle back into its lane, and a lot of sensors and equipment outside of the vehicle, for example, radar, camera, GPS for sensing the location. By constantly monitoring these sensors and analyzing the sensed data by their fast computers, self-driving or autonomous vehicles calculate their own position (longitude & latitude), speed, heading, acceleration, path prediction and receive information about and calculate location, speed, heading, acceleration, path history, path prediction, vehicle size of any other objects on the road. For crash safety of the passengers inside the vehicles there are air bags.

Here is a Summary of the mentioned above DSRC-based Basic Safety Message (BSM) Transmission Parameters:

Proposed Basic Safety Message (BSM) Communication Frequency (F)—10 times per second;

Position (P)—The location information of the host vehicle and surrounding objects enables a safety application on a vehicle to know whether a crash imminent situation exists or is likely to exist in the near future; Because a safety application V2V is generally concerned with a current location and the potential future locations of any entity on the road, vehicles have to provide their own driving data and get from surrounding objects (by messages as in this V2V or by pre-crash sensing [15. 16] and further calculation in other types of communication technologies) following characteristics of the movement during every communication period:

Speed (S);
Heading (H);
Acceleration (A);
Path History ($P_H$);
Path Prediction ($P_P$)
Vehicle Size(V) For a safety application's determination, it is necessary to know how large an object is on the road in order to know how severe a crash may be.

Detailed information about DSRC-based V2V vehicle communication system see in [2].

The statistics show that the number of the victims is indirectly proportional to their weight. It means that to significantly improve safety of the vehicle occupants it is necessary to put stress on controlling the forces applied to the occupants' bodies by more accurately measuring their weights. The sensors also have to measure weight of a vehicle occupant, but not the size of the occupant. because the energy accumulated by the occupant's body in the moving vehicle and which a restraint system has compensated during the crash, is proportional to the mass, but not to the size of the body. That is very important in safety systems.

As we may see from mentioned above contemporary Passenger Classification System, the force applied by an air bag to the adult occupant, especially to the driver, in the air bag system is the same as applied to the person whose weight is 102 Lb and applied to the person whose weight is even 215 Lb or higher. A light occupant in such situation may be injured and heavy occupant may be not protected enough. This is the reason that it is necessary to provide more classes in the Passenger Classification System to differentiate the forces applied to children and adult occupants in case of collision according to their weight.

It noted in [17, 18] that the weight of an occupant measured by the air bag system is not the entire weight of the occupant since some of the occupant's weight will be supported by his or her feet which are resting on the floor or pedals. This is a problem that does not allow to accurately weigh a vehicle occupant in on-board vehicle supplemental restraint system to provide the possibility of an accurate control of the air bag inflation force depending on the real value of the occupant's weight (mass) and eliminate extra force applied to the occupant's body at the time of collision. So, to accurately weigh a vehicle occupant, it is necessary to weigh the whole body of a vehicle occupant including the weight of a foot part of his/her body. NHTSA in [2] addressed this problem to improve the security of the air bags for children and light passengers.

In [19], is provided by age groups and restraint devices use, the number of passenger vehicles occupants that have been killed in crashes in 2016. The relative number of killed in the younger age groups is 2-3 times higher than in other age group.

So, the younger children group needs a more gentle restraint support during a possible crash. To provide this feature, the younger children safety seat needs a lower pressure, not a pyrotechnical type source of gas, as for older children and adults.

All this is not made in the on-board vehicle safety system yet.

SUMMARY OF THE INVENTION

Prior to the present invention, there was no safety providing system in the contemporary and self-driving or autonomous vehicles for accurately weighing an occupant with improved protection for occupants of different sizes as well as minimizing the risk of injury or death from air bags for children and light adults.

These objects and others, which will become apparent hereinafter, are attained in accordance with the invention in a contemporary and also in self-driving or automatic/autonomous vehicle equipped with the innovative ADaptive MUlti-force Safety (ADMUS) system that provides higher protection to occupant bodies of different weights from the extra force applied to them in case of accident by decreasing it according to the occupant's accurate whole body weight measurement and extending the Passenger Classification System.

It is a principal object of the present invention to improve the occupant safety system by more extensive preparations for overcoming an imminent vehicle collision on the road and preventing fatal accidents as well as injuries of the occupants that may be caused by an unsafe force applied to their bodies by the restraint system in the event of a collision.

A further principal object of the present invention is to provide an accurate timing adjustment of different parts of the safety system to prevent occupants of the self-driving or autonomous vehicle from fatalities and injuries in case of collision on the road.

A further principal object of the present invention is to improve the accuracy of the safety system for differentiating the weight of children from the weight of the light women passengers.

A further principal object of the present invention supports the documents provided by NHTSA that say the modern safety systems should provide improved protection for occupants of different sizes. So, it is the principal object of the present invention to provide a safety system for controlling the force applied to the occupant's body measuring not the size, but with the accurately measured weight of the occupant because energy saved by an occupant's body in a moving vehicle is directly proportional to the weight, but not to the size, of the occupant's body.

A further principal object of the present invention is to provide an accurate measuring weight of the vehicle occupants in a safety system of the self-driving and autonomous vehicles by an occupant weighing technology because the statistics show that the number of the accident victims depends on their weight. The lower the weight of the occupants, the larger the number of the victims of this weight category. A more accurate method of measuring weight of the vehicle occupants may be provided by weighing the occupant's whole body, including the weight of the feet not touching the floor, by employing only one weighing unit attached to the occupant's car seat. This provides the possibility to extend also the current Passenger Classification System and more accurately control the force applied to lighter weighing people and youngsters in case of accident.

A further principal object of the present invention is to provide a safety system for protection of the different weight occupants of the self-driving or autonomous vehicle by applying different forces to their bodies at the moment of an accident that are more accurately controlled through the control signals depending on their weights that are modified depending on the morphological data and factors of the car trips in current situation that influence the force applied to the occupant's body.

A further principal object of the present invention is to provide simplified, convenient, and accurate weight measurements of a driver by innovative weighing technology in a safety system of the contemporary and self-driving or autonomous vehicles. This may be made very simple especially in self-driving and autonomous vehicles because the hands of an occupant sitting in a driver's seat do not participate too much in driving the vehicle leaving a parking spot.

It is a further principal object of the present invention to improve the safety and functionality of the vehicle by a TRIple Button Start (TRIBS) method of starting the vehicle' engine. In this embodiment of the present invention, the TRIple Button Start (TRIBS) method covers the following objectives:

1. To start the engine of the vehicle;
2. To weigh an occupant in a driver's seat for safety and healthy purposes;
3. To protect a vehicle if a small child is trying to drive it.

Initial position of the gear selector to provide these goals is in a Park position, and the output of the engine Start Button is operatively connected to the computer. A driver presses in the horizontal direction a Button Start of the engine that is located on the vertical surface of the part of a vehicle, and this produces a force, which provides him/her a support to simultaneously and conveniently lift up his/her feet from the floor/pedals during the weight measurement. By receiving a signal from the engine Button Start, the weighing device accurately measures and computer memorizes the weight of the driver. If an operator/driver/occupant in the driver's seat has a weight less than which satisfies the weight of 5th-percentile adult female in the Table S7.1.4 "Weights and dimensions of the vehicle occupants referred to in Standard § 571.208: Occupant crash protection", the computer suppresses the ignition of the engine of the vehicle and sends a warning message to the control panel. If the driver's weight is equal or higher than weight of 5th-percentile adult female in the Table S7.1.4 "Weights and dimensions of the vehicle occupants referred to in Standard § 571.208: Occupant crash protection", the computer completes starting the engine of the vehicle and memorizing the weight of the driver of the vehicle.

In the time interval $T_{start}$ after the engine of the vehicle had been started, a timer disconnects the Button Start from the driver weighing line, and the Button Start starts to work only for an engine line.

It is a further principal object of the present invention to improve people's healthy by ADMUS-M and ADMUS systems providing an accurate occupant weighing by KEF method based on a horwest (horizontal weighing stability) effect comprising predicting, preventing and treating illnesses, including at least metabolism problems, kidney disorders, etc., during which a person may be weighed multiple times in a vehicle to gain accurate weight measurements without hospitalization.

A further principal object of the present invention is to mitigate injuries from a seat belt by active control of a pretensioner of a self-driving or autonomous vehicle directly from a computing unit according to the occupant's weight, but not size.

A further principal object of the present invention is to create a Driver Classification System for the safety purposes of the person in a driver's seat. The driver is in a more dangerous situation than passengers because his/her face and body are closer to obstacles such as a steering wheel in case of a crash. It may be done by an accurate measuring of the weight of a person in a driver's seat in the self-driving or autonomous vehicle by the innovative occupant weighing technology for the driver safety purposes.

Another embodiment of the present invention related to a self-driving or autonomous vehicle is that by using their own heading, speed, acceleration, and location and by receiving the same kind of information from the other vehicle or object on the road, they monitor the distance and accurately predicted timing of the imminent crash. By continuously and accurately monitoring the timing of the imminent crash, the ADMUS system provides higher protection to occupant bodies of different weight from the extra force applied to them in case of accident by more extensive preparations for overcoming possible negative consequences of an imminent vehicle collision on the road and preventing fatal accidents, as well as injuries, of the occupants that may be caused by an unsafe force applied to their bodies by the restraint system in the event of a collision.

Another embodiment of the present invention related to a self-driving or autonomous vehicle improves the accuracy of the safety system for differentiation of weight of children from the weight of the light women passengers by controlling the force applied to the occupant's body measuring not the size, but with the accurately measured weight of the occupant, whose measurement is made by the innovative KEF weight measuring device and method [20, 21]. This method is safer because energy saved by an occupant's body in a moving vehicle is directly proportional to the weight, but not to the size, of the occupant's body.

Another embodiment of the present invention related to a self-driving or autonomous vehicle improves the accuracy of the safety system by providing the extended current Passenger Classification System and more accurately controlling, by using innovative weight measuring technology, the force applied to lighter weighing people and youngsters in case of accident.

Another embodiment of the present invention related to a contemporary vehicle, and also to a self-driving or autonomous vehicle with the simplified, convenient, and accurate weight measurements of a driver of a contemporary or a self-driving vehicle or an occupant in a driver seat in autonomous vehicle at the beginning of a trip by innovative weighing technology in a safety ADMUS system. This is made very simple because hands of an occupant sitting in a driver seat in a safety ADMUS system of the autonomous vehicle do not participate in driving the vehicle leaving a parking spot.

Another feature of the present invention relates to a self-driving or autonomous vehicle having ADMUS system and pre-crash sensing devices.

Another embodiment of the present invention relates to a self-driving or autonomous vehicle with a cellular communication technology and provides simplified, convenient, and accurate weight measurements of a driver of a self-driving vehicle at the beginning of a trip or an occupant in a driver seat in autonomous vehicle by innovative weighing technology in a safety ADMUS system. This is made very simple because hands of an occupant sitting in a driver seat in a safety ADMUS system of the autonomous vehicle do not participate in driving the vehicle.

One embodiment of the present invention relates to a contemporary or a self-driving or autonomous vehicle having an air bag safety system and an innovative weighing technology for use in the accurate weighing of an occupant based on a weighing moderator to prevent extra force applied to the occupant's body in case of collision.

Another feature of the present invention is that it provides modification of the occupant's original weight accurately measured by the innovative weighing technology in a contemporary or a self-driving or autonomous vehicle before the beginning of a trip in accordance with the values of such parameters as the severity of the crash, position of the occupant, using a seat belt.

Another embodiment of the present invention is related to a push button of a weighing moderator operatively connected to a computer. When a vehicle occupant presses a push button of a weighing moderator, the push button sends a signal to the computer to measure and memorize weight of the occupant and said push button may function in the following variants:

a) said push button will continue sending the signal to the computer if the occupant will continue to push the button or b) signal sent by the push button will be ignored by the computer itself after computer completed to measure and memorize the occupant's weight.

Another feature of the present invention related to contemporary, self-driving, and autonomous vehicles is providing an improved accuracy of the safety system for differentiating occupants by weight, especially children from the light women occupants.

Also disclosed is an on-board vehicle Adaptive Multiforce Safety Mixed (ADMUS-M) system, including: Electronic Computing and Control Unit (ECU) connected to the vehicle internal sensors and to the vehicle main computer, which in turn is connected to the crash sensing related sensors and to the vehicle driving sensors, and ECU is also operatively connected to the occupant weighing devices of the ADMUS-M system connected to the seats of passengers which are operatively connected to the according inflators through the according controllers which are connected to ECU by using innovative KEF method of occupant weighing, and the restraint power line of the air bag of the younger child seat is connected to a low pressure air bag source which is connected to and controlled by ECU in a low risk deployment.

In addition to one or more of the features described above, or as an alternative to any of the foregoing embodiments, wherein the system provides an accurate occupant weighing KEF method based on a horwest (horizontal weighing stability) effect by providing a force in a horizontal direction of a predetermined value to a vertical surface of a vehicle and simultaneously, conveniently lifting feet above the floor and keeping them up during the weight measurement.

In addition to one or more of the features described above, or as an alternative to any of the foregoing embodiments, wherein a variable WELF (WEight Loss by Feet) of a vehicle occupant equals to a ratio (measured in %) of weight measurement of the occupant's body who is not yet fastened sitting in a car to his/her original weight.

In addition to one or more of the features described above, or as an alternative to any of the foregoing embodiments, wherein an Electronic Computing and Control Unit (ECU) is connected to the seat of the driver which in turn connected to the air bag of inflator through the controller which is connected to said ECU, and the restraint power line of said air bag of the driver is controlled by ECU, wherein variable WELF of a vehicle driver depends on the position of his/her feet and equals to a ratio (measured in %) [have been measured] of weight measurement of the driver's body, who is not yet fastened sitting in a car, to his/her original weight measured by said KEF method.

Also disclosed us a method for negative consequences mitigation of an imminent vehicle crash and enhancing safety of vehicle occupants comprising the following steps: weighing and memorizing weight of younger children, older children, adult passengers and a driver by employing the mixed ADMUS-M system and innovative KEF method of an occupant weighing at the start of a vehicle engine by pushing a TRIple Button Start (TRIBS); employing data processed and analyzed by the main computer collected from internal and outside sensors, radar, cameras and other pre-crash sensitivity equipment to get a warning that there is an object on the road that is placed in the collision list; monitoring all needed trip data to receive regular accurate data from the main computer about coordinates and time of predicted imminent collision with [another] said object on the road, size and speed of this object, etc.; starting to preset the slow part of the restraints; preset the younger children restraint gas container; if the child is seated in a child car seat fixed on a car seat facing backward, then the back of this child seat must recline on the car seat completely to the end with an according speed calculated by said main computer or ECU before an imminent collision; if the child is seated in a child car seat facing forward, then both the back of the used car seat on which the child seat is fixed together with a light child's seat back must recline completely to the end with an according speed calculated by said main computer or ECU before an imminent collision; modifying weight of the vehicle occupants by said ECU depending on the change of both the morphological factors and the factors of the car trip situation and their combinations to control the force applied to the occupants bodies' before a possible imminent collision according to the Occupant Classification System; if current modification of the Adaptive Multi-force Safety system provides a feature of a low risk deployment of a child restraint, allow in the corresponding following step the deployment of the child restraint with a low risk, in other case suppress deployment of a child restraint; deploying a child restraint with a low risk at a penultimate BSM (Basic Safety Message) message before the imminent crash predicted by main computer; turning on the slow part of the adult restraint; turning on the fast part of the adult restraint and activating the inflator; sending a message to the black box about the last conditions of the children and adults restraint systems.

In addition to one or more of the features described above, or as an alternative to any of the foregoing embodiments, wherein in the time interval $T_{start}$ after the engine of the vehicle had been started, a timer disconnects the Button Start from the driver weighing line, and the Button Start begins to work only for an engine line.

In addition to one or more of the features described above, or as an alternative to any of the foregoing embodiments, wherein weighing a passenger includes: A. Providing the passenger by a physical force to move his/her body in the seat—this goal is reached by: 1.a. Pushing horizontally the closest vertical stationary part of the vehicle by the passenger and according to the $3^{rd}$ Newton's Law to get the force to move the feet from the floor or/and pedals; 1.b. Moving up the feet from the floor or/and pedals; B. Providing a signal to the Computer to start to measure and memorize the weight of the passenger, who is sitting in the car seat with feet moved up from the floor or/and pedals, by: 2.a. Sending a signal to the Computer while pushing horizontally a pushbutton or switch (called as a kemoder) fixed on the closest vertical stationary part of the vehicle by the passenger or; 2.b. Sending a voiced command to the Computer to start to measure and memorize the weight of the passenger sitting in the car seat simultaneously with activity at point A. 1.b. 2.c. Monitoring weight of the passenger before, during, and after the procedure A. Analyze by the Artificial Intellect (AI) technology and memorize the original weight of the passenger if the calculated WELF of the passenger is more than 15% or as predicted by instruction given; C. Providing employing at point B.2.a. the pushbutton or switch fixed on the closest vertical stationary part of the vehicle and called as kemoder according to the KEF method to accurate occupant weight measurement.

In addition to one or more of the features described above, or as an alternative to any of the foregoing embodiments, wherein weighing a driver provides realization of a TRIBS (TRIple Button Start) function comprising: 1). starting the engine of the vehicle, 2). weighing for safety purposes an occupant who is in a driver's seat, 3). protecting a vehicle if a small child is trying to drive it. Providing this function comprising the following steps: By an operator in a driver's seat of the vehicle pressing in the horizontal direction a Button Start of the vehicle engine located on a substantially vertical surface of the vehicle to start the engine and sending a signal to the computer to start the driver seat occupant's weight measurement and simultaneously and conveniently lifting up his/her feet from the floor and pedals during the weight measurement; Measuring weight of a person in the driver's seat through the weighing device connected to the driver's seat; By receiving a signal from the engine Button Start, the computer memorizes the weight of the occupant in the driver's seat. If the occupant in the driver's seat has a weight less than which satisfies the weight of 5th-percentile adult female in the Table S7.1.4 "Weights and dimensions of the vehicle occupants referred to in Standard § 571.208: Occupant crash protection", the computer suppresses the ignition of the engine of a vehicle and sends a warning message to the control panel. If the driver's weight is equal or higher than weight of 5th-percentile adult female in the Table S7.1.4 "Weights and dimensions of the vehicle occupants referred to in Standard § 571.208: Occupant crash protection", the computer completes starting the engine of the vehicle and saves in its memory the weight of the driver of the vehicle.

In addition to one or more of the features described above, or as an alternative to any of the foregoing embodiments, wherein an on-board vehicle Adaptive Multi-force Safety Mixed (ADMUS-M) system by employing KEF weighing method provides to extend number of classes (at least by 3) of the current Passenger Classification System to more accurately control the force applied to lighter weighing people and youngsters in case of accident.

In addition to one or more of the features described above, or as an alternative to any of the foregoing embodiments, wherein an on-board vehicle ADMUS-M system by employing accurate KEF weighing method provides a Driver class in a weight Classification System for the safety purposes of the person in a driver's seat by an accurate measuring of the weight of a person in a driver's seat in the regular, self-driving, or autonomous vehicle for the driver safety purposes.

In addition to one or more of the features described above, or as an alternative to any of the foregoing embodiments, wherein an air bag safety system of a contemporary, a self-driving/autonomous vehicle provides modification of the occupant's original weight measured by the innovative KEF weighing technology before the beginning of the trip to control and prevent by it an unsatisfied force applied to the occupant's body in case of collision in accordance with the values of current trip situation parameters as the severity of the crash, position of the occupant, using a seat belt, etc.

In addition to one or more of the features described above, or as an alternative to any of the foregoing embodiments, wherein an on-board vehicle Mixed Adaptive Multi-force Safety (ADMUS-M) system provides a low power gas pressure of non-pyrotechnical source of restraint support during a possible crash that makes a gentle pressure on an infant or toddler in a safety seat in case of crash.

In addition to one or more of the features described above, or as an alternative to any of the foregoing embodiments, wherein an on-board vehicle mixed ADMUS-M system provides a timing presetting an accurate measurement and timing adjustment of different parts of the safety system to prevent occupants of the self-driving/autonomous vehicle from fatalities and injuries in case of collision on the road by following steps: Provide more extensive preparations for overcoming an imminent vehicle collision on the road by KEF method of accurate weighing an occupant based on a weighing moderator to prevent extra force applied to the occupant; Immediate preset of the slow part of the restraint unit if the pre-crash sensitivity equipment places any object on the road in the collision list by putting the slow part of the restraint unit in the middle position of its moving range; Putting the seat backs of the young children in a lower substantial horizontal position at a corresponding speed by unfolding the seat backs of the younger children to the end with an according speed if the pre-crash sensitivity equipment places any object on the road in the collision list.

In addition to one or more of the features described above, or as an alternative to any of the foregoing embodiments, wherein, in case the main computer placed any object in the collision list during the Pre-Crash scanning and if there is any infant or toddler on-board, the on-board vehicle Mixed Adaptive Multi-force safety (ADMUS-M) system provides the following steps: preparation for changing the position of youngster seat backs before the imminent crash in self-driving/autonomous vehicle from a vertical to a substantially horizontal; calculating a required speed of seat back movement according to the distance to the object on the road and occupant safety purposes; changing the position of youngster seat back from a vertical to a substantially horizontal.

In addition to one or more of the features described above, or as an alternative to any of the foregoing embodiments, wherein the ADMUS-M system prevents malfunction (suppression) of the air bag safety system for 5th-percentile adult females and adult light males by the following steps: by finding out before the beginning of the trip the original weight of the occupant by KEF method; by finding out at the beginning of the trip the measured weight of the occupant when he/she is sitting not yet fastened in a car and the feet are resting on a floor or pedals; if calculated value of WELF is more than 20% and the last measured weight overlapped a closest to the child's weight range in the Passenger Classification System, it is necessary to eliminate the possible suppression of the air bag of a 5th-percentile woman or a light man before the vehicle's possible imminent crash during a trip and send a message to the driver.

In addition to one or more of the features described above, or as an alternative to any of the foregoing embodiments, wherein the value of WELF of the vehicle owner or family member who may be (as a 5th-percentile woman or a light man) a potential victim of the vehicle crash is registered in the dealership at the time of buying a vehicle, and a note is made in the documents.

In addition to one or more of the features described above, or as an alternative to any of the foregoing embodiments, wherein the algorithm of an air bag deployment (suppression) of the 5th-percentile woman sitting in the contemporary, self-driving/autonomous vehicle is prepared on a base of an Artificial Intellect (AI) by employing claim 6 and data including statistics of weather temperature, clothes and shoes weight, time of year, occupant's weight history.

In addition to one or more of the features described above, or as an alternative to any of the foregoing embodiments, wherein to improve people's health, the KEF and TRIBS methods are provided that help predict, prevent and treat at least including such illnesses as metabolism problems, kidney disorders, obesity, etc., and during the whole period of treatment the patient may be weighed multiple, not restricted number of times per day in a vehicle to gain accurate weight measurements without hospitalization.

In addition to one or more of the features described above, or as an alternative to any of the foregoing embodiments, including an Electronic Computing and Control Unit (ECU) connected to the vehicle internal sensors and to the vehicle main computer, which in turn is connected to the crash sensing and to the driving related sensors of the vehicle, and ECU by using innovative KEF method of occupant weighing and TRIple Button Start (TRIBS) feature is operatively connected to the occupants weighing devices of the system connected in turn to the seats of the vehicle occupants by the according inflators connected to the according air bags of inflators through the according controllers which are connected to said ECU, and the restraint power line of the air bags of each individual is connected to a pyrotechnical source which is connected to and controlled by ECU and suppressed by it if a child is in a seat, wherein variable WELF of a vehicle occupant depends on the position of his/her feet and equals to a ratio (measured in %) of weight measurement of the passenger's body, who is not yet fastened sitting in a car, to his/her original weight measured by KEF method.

Also disclosed in an instruction for the owner of the vehicle which equipment includes a feature of an on-board vehicle Adaptive Multi-force Safety Mixed (ADMUS-M) system for negative consequences mitigation of an imminent vehicle crash and for enhancing safety of occupants of the vehicle. "Dear buyer of a vehicle: Your vehicle may be a contemporary, self-driving, or autonomous vehicle. It is equipped by several innovative patented systems and devices. One of them is the ADaptive MUlti-force Safety (ADMUS) system that provides higher protection to occupant bodies in case of accident, especially for 5th-percentile women and light men. This problem was addressed by NHTSA (National Highway and Traffic Safety Administration) in Notice of Proposed Rulemaking. DOT of transportation NHTSA. 49 CFR Part 571 [Docket No. NHTSA-2016-0126] RIN 2127-AL55 NHTSA 2016. The other patented systems, depending on modification of your vehicle, may be: a system for younger child air bag low risk deployment, innovative accurate KEF method and device of passenger and driver weighing, safety variable WELF (Weight loss by feet) measurement, TRIple Button Start (TRIBS) system for protecting a vehicle if a small child is trying to drive it, a safety system of reclining a child's seat back [recline] before an imminent collision, a system of expanding the number of classes of the current Passenger Classification System, including a Driver class in the Classification System, Dear buyer of the vehicle, please do not miss any required check ups of the mentioned above devices and systems to provide the best environment for advanced safety features of your vehicle."

BRIEF DESCRIPTION OF THE DRAWINGS

The following descriptions should not be considered limiting in any way. With reference to the accompanying drawings, like elements are numbered alike:

FIGS. 1a and 1b shows overlapping of 50th-percentile 10-year-old child class of an air bag system by the 5th-percentile adult female in the Table S7.1.4 "Weights and dimensions of the vehicle occupants referred to in Standard § 571.208: Occupant crash protection";

DETAILED DESCRIPTION OF THE PRESENT INVENTION

Figure 1A:
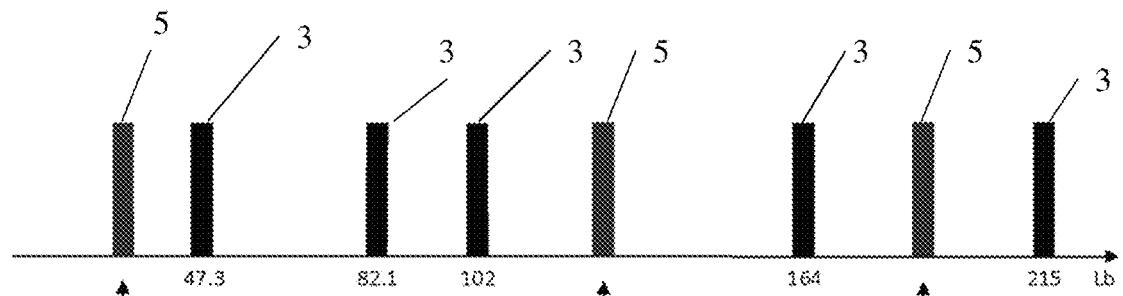
Figure 1A:
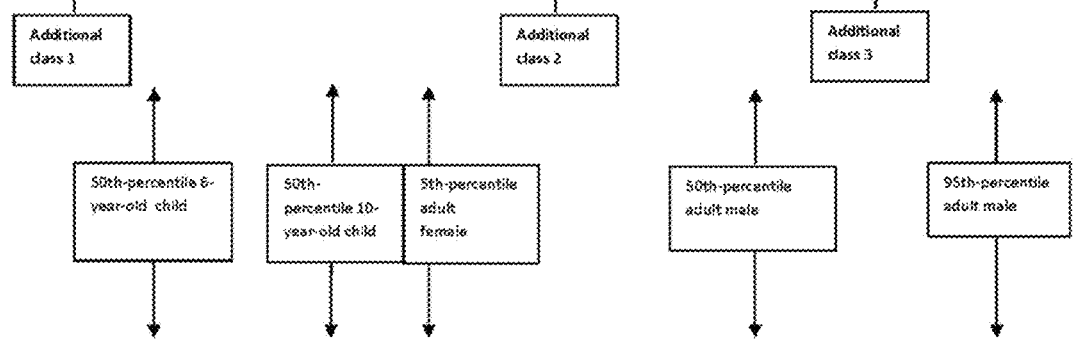
Figure 1A:
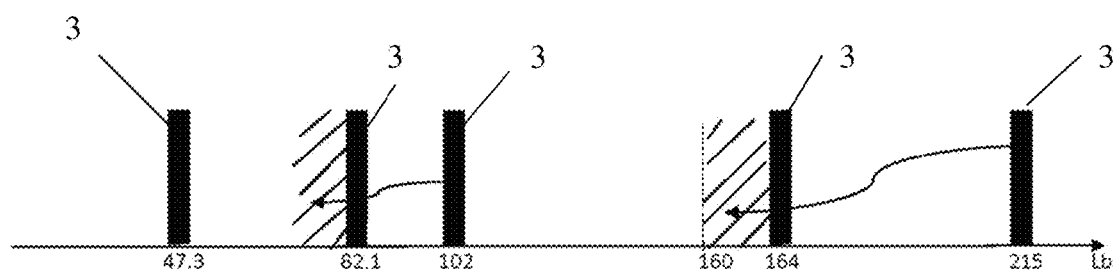

As we could see, all proposed and realized self-driving and autonomous vehicles use the same basic qualities and characteristics for sensing the road and any objects on it to predict the future behavior of other road users in 360 degrees around. The parameters used are: own parameters of a vehicle such as Position (P) (Longitude & Latitude), Speed (S), Heading (H), Acceleration (A), Frequency of Pre-Crash Sensing (F) signals, Path Prediction (Pp) and calculated Position ($P_O$), and also Speed ($S_O$), Heading ($H_O$), Acceleration ($A_O$), Path Prediction ($Pp_O$), Size ($Z_O$) of any object on the road, and time interval (To) and a distance ($D_O$) left to the position of the point of the imminent crash with any other object on the road, and the number (No) of the Pre-Crash Sensing attempts left before the imminent crash. If calculation of a Position of the vehicle was made through the Reference Points, the correction by a part of the car's length is needed for calculation of a distance from bumper to bumper.

Let us find out how the present invention relates to the methods and apparatuses providing mitigation results of an imminent vehicle collision on the road by preventing fatalities as well as injuries that may be caused by extra force applied to the occupant's body by air bag and accurate on-time preparation to and controlling the applied force in the event of collision. For this purpose, the V2V vehicle communication system, well described by NHTSA [2], will be used. This vehicle communication system uses in total the same main driving parameters and characteristics as all other described previously vehicle communication systems and is chosen as example for analyzing the methods and devices proposed in this application for preventing fatalities and mitigating injuries may be caused by extra force applied by air bag to the occupant's body in a contemporary or self-driving/autonomous vehicle in the event of collision.

An example of a simplified calculation of a time interval (To) that is left for a vehicle to reach the position of the point of the imminent crash with any other object on the road and the number (No) of the Pre-Crash Sensing attempts left before the imminent crash happens are given in the Table 2 depending on the Pre-Crash speed of the vehicle ΔV and the initial distance $D_O$ between the vehicle and another object.

We assume that the distance (Do) between the vehicle and the point of the imminent crash with any other object on the road is sensed, calculated, and predicted by a pre-crash sensing system of the vehicle. The calculations of the $T_O$ and $N_O$ are made for Basic Safety Message (BSM) Communication Frequency (Pre-Crash scan mode) F=10 times per second. The predicted distance $D_O$ between the vehicle and another object on the road is assumed linear at all time during each calculation up to the collision, and the pre-crashed speed ΔV of the vehicle is assumed constant at all this time. More complicated example of such calculation may be found in [2].

TABLE 2

| ΔV | ΔV kmph | | | 25 | | | 40 | | | 55 | | |
|---|---|---|---|---|---|---|---|---|---|---|---|---|
| | Statistical % of crashes | | | 41 | | | 14 | | | 2 | | |
| $D_O$ | Distance m | 100 | 50 | 10 | 100 | 50 | 10 | 100 | 50 | 10 | | |
| $T_O$ | Time needed s | 14.4 | 7.200 | 1.440 | 9.000 | 4.500 | 0.900 | 6.545 | 3.273 | 0.654 | | |
| $N_O$ | The projected number of BSMs before the imminent crash | 143 = 128 + 15 + 100 ms | 71 + 100 ms | 14 + 40 ms | 89 + 100 ms | 44 + 100 ms | 8 + 100 ms | 65 + 45 ms | 32 + 73 ms | 6 + 54 ms | | |

Assume that an object on the road with a relatively high speed was captured and placed in an object list during the Pre-Crash scanning. According to the Table 2, the vehicle will have the imminent crash with this object on the road in 7.2 seconds if the pre-crash speed ΔV of the vehicle was 25 kmph, the initial distance Do between the vehicle and another object was 50 meters, and that crash will happen in 100 milliseconds after the 71 times BSM messages or after 71 times Pre-Crash scanning repeated with frequency F=10 times per second. In case the vehicle's pre-crash speed ΔV was 55 kmph and the initial distance Do between the vehicle and another object was the same 50 meters, that crash will happen in 73 milliseconds after the 32 times BSM messages or after 32 times Pre-Crash scanning. To mitigate the results of the imminent crash, the computer monitors a distance and accurately predicted timing of the imminent crash. By continuously and accurately monitoring the timing of the imminent crash, the ADMUS system provides higher protection of the different weight occupant bodies from the extra force applied to them in case of accident by more extensive preparations for overcoming an imminent vehicle collision on the road and preventing fatal accidents as well as injuries of the occupants that may be caused by an unsafe force applied to their bodies by the restraint system in the event of a collision.

The number of fatalities and injuries in the vehicles with the V2V technology and also in the regular vehicles that will be eventually finalized by aftermarket repairing may be substantially decreased by employing an accurate weighing the occupants of a vehicle.

As noted in [17, 18], the measured weight of an occupant is not the entire original weight of the occupant since some of the occupant's weight will be supported by his or her feet which are resting on the floor or pedals. Contribution of the WEight Lost of the Feet (WELF further in the text) part of the body to a total original weight of a person may be evaluated very easily, and it is about 15-30% or more of the whole body weight. In [17] this loss of the occupant's weight was given as 20%. Some data for WELF were received in this invention in experiments and shown in Tables 3, 4, and 5. The whole picture of the weight lost by a vehicle occupant during measuring his/her weight while one is sitting in the car seat and the feet are resting on the floor or pedals and supporting the body, may be clear after receiving a statistical data. The WELF is a problem that does not allow to accurately weigh a vehicle occupant in on-board vehicle safety restraint system to provide the possibility of an accurate control of the air bag inflation force depending on the real original value of the occupant's weight (mass) and eliminate extra force applied to the occupant's body at the time of collision by improving the Passenger Classification System and providing an improved accuracy of the safety system for differentiating occupants by weight, especially children from the light women.

As we may see from Table 3, the value of an error of measuring weight of an occupant sitting in a seat of the contemporary on-board vehicle SRS air bag safety system may reach around 30% of original occupant's weight. For example, in the Table 3 in the range from 144 to 221 Lb of the original weights of occupants, the value of the mistake of occupant weight measurement WELF reaches 29.1%. This means that some two classes in the Occupant Classification System SRS may be overlapped.

value is 27.6%, 50th-percentile adult male class will be overlapped by the measured weight of the 95th-percentile adult male class, and the SRS air bag safety system will not recognize whom it is necessary to treat: 50th-percentile or 95th-percentile adult male, although the force applied to the bodies of these two different weight occupants should be different.

For now it seems the worst case of overlapping is on the border of 50th-percentile 10-year-old child and 5th-percentile adult female. As in the previous example, in case of the 5th-percentile adult female whose original weight around 102 Lb (according to the Table S7.1.4 "Weights and dimensions of the vehicle occupants referred to in Standard § 571.208") and if its maximum variable $WELF_{max}$ value is only more than 20%, the 50th-percentile 10-year-old child class will be overlapped by the measured weight of the 5th-percentile adult female class. In this case, the air bag safety system will malfunction. It will suppress the air bag when it should be deployed because the 5th-percentile adult female is in the seat.

Another such malfunction case was found in Table 4 when a group of adult people was checked for their value of WELF. The weight measurement of this group of six adult women was provided by "ResCare" Adult Day Care Community Center, Hamden, Conn. As we may see from Table 4, women ##5 and 6 may be related to the 5th-percentile adult females. Woman #5 has original weight of 113 Lb, and

TABLE 3

| | | | | Weight (Lb)* | | | |
|---|---|---|---|---|---|---|---|
| | | | Horizontal distance D (cm) from feet on the | Feet position (torso on the scale) | | | Percentage of the occupant's |
| No. | Date | Original weight | floor to the torso on the scale | Hands are on the groins | Hands down in the air | Hands on the knees | weight measured loss (WELF) |
| 1 | Mar. 29, 2018 | 151 Man, 82 | 70 max 55 mid 40 min | 128 121 114 | 126 114 109 | 115 112 107 | 15.2-23.8% 19.9-25.8% 24.5-29.1% |
| 2 | Mar. 30, 2018 | 182 Woman, 77 | 60 max 50 mid 40 min | 155 150 143 | 154 149 140 | 150 147 138 | 14.8-17.6% 17.6-19.2% 21.4-24.2% |
| 3 | Mar. 29, 2013 | 148 Man, 77 | D min | 112 | — | 109 | 25.8-26.4% |
| 4 | Jul. 25, 2014 | 151 Man, 78 | D min | — | — | 110 | 27.2% |
| 5 | Sep. 24, 2016 | 144 Man, 80 | D min | — | — | 120 | 16.7% |
| 6 | Jul. 14, 2018 | 221 Man, 45 | D max D mid D min | 197 189 173 | 193 178 166 | 188 173 160 | 10.9-14.9% 14.5-19.5% 21.7-27.6% |
| 7 | Nov. 10, 2018 | 134 F 15 | D min | — | | 93 | 30.6% |
| 8 | Nov. 10, 2018 | 91 F 11 | D min | — | | 65 | 28.6% |

In the FIG. 1a is given the Table S7.1.4 "Weights and dimensions of the vehicle occupants referred to in Standard § 571.208: Occupant crash protection". There are 5 classes of occupants in the Table S7.1.4 "Weights and dimensions of the vehicle occupants referred to in Standard § 571.208" showed as 5 black bars 3 in FIG. 1a: 50th-percentile 6-year-old child (47.3 Lb), 50th-percentile 10-year-old child (82.1 Lb), 5th-percentile adult female (102 Lb), 50th-percentile adult male (164 Lb), and 95th-percentile adult male (215 Lb). As we see from Table 3, in case of the 95th-percentile adult male whose original weight 221 Lb (that is in the range 215 Lb) and its maximum variable $WELF_{max}$ her measured weight in the simulator of the vehicle seat while her feet are on the floor, is 84 Lb. Her calculated WELF is 25.7%. In case of the vehicle collision, the air bag system will recognize her as adult (84 Lb>82.1 Lb) and her air bag will be deployed.

Woman #6 has original weight of 108 Lb, and her measured weight in the simulator of the vehicle seat while her feet on the floor, is 78 Lb. Her calculated WELF is 27.8%. In case of her vehicle collision, the air bag system will malfunction by recognizing her as the 50th-percentile 10-year-old child (78 Lb<82.1 Lb), and her air bag will not be deployed.

TABLE 4

The third such malfunction case was found in Table 5 when a group of older children was checked for their value of WELF.

| No. | Date | Name | age | sex | Weight (Lb) | | | Percentage of the occupant's weight measured loss (WELF) |
| | | | | | Original weight | Hands on the knees | Difference | |
| --- | --- | --- | --- | --- | --- | --- | --- | --- |
| 1 | Oct. 30, 2018 | Maya | 82 | F | 154 | 110 | 44 | 28.6% |
| 2 | Oct. 30, 2018 | Galina | 79 | F | 148 | 101 | 47 | 31.8% |
| 3 | Oct. 30, 2018 | Bella | 81 | F | 135 | 103 | 32 | 23.7% |
| 4 | Oct. 30, 2018 | Sophia | 81 | F | 140 | 109 | 31 | 22.1% |
| 5 | Oct. 30, 2018 | Angela | 95 | F | 113 | 84 | 29 | 25.7% |
| 6 | Oct. 30, 2018 | Inness | 85 | F | 108 | 78 | 30 | 27.8% |

The weight measurements in the Table 5 were provided by children's music studio in the city of Woodbridge, CT. National Music Teachers Association (New Haven Chapter).

As we may see from Table 5, ##7 and 9 may be related by weight to the 5th-percentile adult females. Woman #7 has original weight of 105 Lb, and her measured weight in the simulator of the vehicle seat while her feet are on the floor, is 74 Lb. Her calculated WELF is 29.5%. In case of her vehicle collision, the air bag system will malfunction by recognizing her as the 50th-percentile 10-year-old child (74 Lb<82.1 Lb) and her air bag will not be deployed.

TABLE 5

| No. | Date | Name | age | sex | Weight (Lb) | | | Percentage of the occupant's weight measured loss (WELF) |
| | | | | | Original weight | Hands on the knees | Difference | |
| --- | --- | --- | --- | --- | --- | --- | --- | --- |
| 1 | Oct. 22, 2018 | Libby | 12 | F | 77 | 54 | 23 | 29.8% |
| 2 | Oct. 22, 2018 | Nell | 13 | F | 83 | 59 | 24 | 28.9% |
| 3 | Oct. 22, 2018 | Sieanna | 15 | F | 138 | 98 | 40 | 28.98% |
| 4 | Oct. 22, 2018 | Mei | 16 | F | 118 | 97 | 21 | 17.8% |
| 5 | Oct. 23, 2018 | Sofia | 15 | F | 158 | 108 | 50 | 31.6% |
| 6 | Oct. 24, 2018 | Veronica | 16 | F | 149 | 111 | 38 | 25.5% |
| 7 | Oct. 24, 2018 | Sophia | 13 | F | 105 | 74 | 31 | 29.5% |
| 8 | Oct. 24, 2018 | Leela | 14 | F | 158 | 105 | 53 | 33.54% |
| 9 | Oct. 25, 2018 | Devin | 12 | F | 102 | 74 | 28 | 27.45% |
| 10 | Oct. 26, 2018 | Sophia | 13 | F | 80 | 55 | 25 | 31.25% |

Woman #9 in Table 5 has original weight of 102 Lb, and her measured weight in the simulator of the vehicle seat with her feet on the floor, is 74 Lb. Her calculated WELF is 27.45%. In case of her vehicle's collision, the air bag system will malfunction by recognizing her as 50th-percentile 10-year-old child (74 Lb<82.1 Lb), and her air bag will not be deployed.

The variable WELF may be used to predict malfunction of an air bag safety system (especially for 5th-percentile adult females and old light males) in a contemporary, self-driving, and autonomous vehicle where an accurate weight measuring technology of an occupant is not used.

As we may see from FIG. 1a, and Tables 3-5, to mitigate the negative consequences of a crash on a road for a 5th-percentile woman or light man sitting in the contemporary, self-driving, or autonomous vehicle where an accurate weight measuring technology of an occupant is not available, it is necessary to find out at the beginning of the trip the original weight of this occupant and her/his measured weight when she/he is sitting in the seat. This last weight will be less than original weight because the feet are resting on the floor or pedals. If this weight overlaps a closest child weight range, it is necessary to eliminate the possible suppression of the air bag of the 5th-percentile woman or light man before the vehicle's imminent crash during a trip.

The time interval for regular WELF measuring has to be established for contemporary, self-driving, and autonomous vehicles where the KEF weight measuring technology of an occupant is not available.

Due to the of existence of the described above problem of overlapping and $WELF_{max}$ high value up to 30%, the number of properly functioning weight classes in the contemporary vehicles for adults in the Table S7.1.4 "Weights and dimensions of the vehicle occupants referred to in Standard § 571.208" may really not be more than 3 classes that drastically decreases the accuracy of weighing occupants of a vehicle and their safety. This means it is necessary to provide a safety system for protection of the different weight occupants of the contemporary and self-driving or autonomous vehicles by applying different forces to their bodies that are more accurately controlled at the moment of an accident.

The error of a vehicle occupant weight measurement may be drastically decreased by employing the occupant weighing innovative KEF method [20, 21] and using this weighing method to eliminate the WELF error at all. In this case, the energy generated by the occupant's body at the time of collision may be accurately measured before the collision and used for safety purposes in the vehicle air bag system.

Using the KEF method is important to provide effectiveness and accuracy for occupant weighing. It is based on a horwest (horizontal weighing stability) effect that states: the value of a weight measurement of an object located in a closed system on a weighing unit doesn't change while this object provides a bi-directional force in a horizontal direction of a predetermined value to a vertical surface of another object, which is a predetermined distance away [19]. The horwest effect can be used to implement the simplified weighing apparatus for accurately weighing the vehicle occupant. Applications of KEF vehicle occupant weighing technology based on horwest effect are also provided in [22, 23].

Moreover, the innovative KEF method can provide a simplified and accurate occupant's weight measurement in a car or a motor vehicle, especially a passenger vehicle such as an automobile, a van, a self-driving car, a corporate vehicle, a limousine, or a truck equipped with an occupant safety device such as air bag Supplemental Restraint System (SRS) by employing a weighing unit (weight sensors) connected to the seat of the vehicle occupant, whose output is connected to the computing and control unit of the SRS, by pushing horizontally a switch of the weighing moderator, located above the waist of the occupant on a substantially vertical surface of the vehicle (for example, on a steering wheel, an instrument panel, or a dash board) at the beginning of the trip, and simultaneously, conveniently lifting feet above the floor and keeping them up during the weight measurement, measuring occupant's weight by the weighing unit. Subsequent processing of the collected weight of the vehicle's occupant by the computing and control unit while receiving the signal from the switch of the weighing moderator, modifying this original weight measurement of the vehicle occupant by the current values of the morphological data and factors of the car trip situation and transmitting this processed value of the vehicle occupant's weight to the air bag control unit to apply, in case of a collision, an appropriate force to the occupant's body, whose value will be calculated according to the modified and accurately measured occupant's original weight. The accuracy of weighing a vehicle's occupant and, accordingly, providing an accurate value of the force applied to the different weights of the occupants' bodies may be improved up to 20-30% by employing KEF method.

The results of measuring WELF value of the vehicle occupants in different positions in a seat showed that $WELF_{min}$ is around 15%. The value of variable $WELF_{min}$ may be used to predict, find, and eliminate by KEF method a malfunction of an air bag safety system (especially for 5th-percentile adult females) in a contemporary, self-driving, and autonomous vehicle where an accurate weight measuring KEF technology of an occupant will be employed.

The following is an instruction for the owner of the vehicle which equipment includes a feature of an on-board vehicle Adaptive Multi-force Safety Mixed (ADMUS-M) system for negative consequences mitigation of an imminent vehicle crash and for enhancing safety of occupants of the vehicle.

"Dear buyer of a vehicle:

Your vehicle may be a contemporary, self-driving, or autonomous vehicle. It is equipped by several innovative patented systems and devices. One of them is the ADaptive MUlti-force Safety (ADMUS) system that provides higher protection to occupant bodies in case of accident, especially for 5th-percentile women and light men. This problem was addressed by NHTSA (National Highway and Traffic Safety Administration) in Notice of Proposed Rulemaking. DOT of transportation NHTSA. 49 CFR Part 571 [Docket No. NHTSA-2016-0126] RIN 2127-AL55 NHTSA 2016.

The other patented systems, depending on modification of your vehicle, may be:

a system for younger child air bag low risk deployment, innovative accurate KEF method and device of passenger and driver weighing, safety variable WELF (Weight loss by feet) measurement, TRIple Button Start (TRIBS) system for protecting a vehicle if a small child is trying to drive it, a safety system of reclining a child's seat back [recline] before an imminent collision, a system of expanding the number of classes of the current Passenger Classification System, including a Driver class in the Classification System, Dear buyer of the vehicle, please do not miss any required check ups of the mentioned above devices and systems to provide the best environment for advanced safety features of your vehicle."

To mitigate the negative consequences of a crash on a road for a 5th-percentile woman sitting in the contemporary, self-driving, or autonomous vehicle, it is necessary to know in advance or measure it at the beginning of the trip by KEF method an accurate original weight of this occupant and her measured weight when she/he is sitting in the seat. This last weight will be less than original weight because the feet are resting on the floor or pedals. If this weight overlaps a closest child weight range, it is necessary to eliminate the possible suppression of the air bag of the 5th-percentile woman before the vehicle's imminent crash during a trip. The value of WELFmin=15% and higher may be provided as minimal value of base value WELF to start to solve a problem of suppressing the deployment of air bag of the 5th-percentile woman sitting in the contemporary, self-driving, or autonomous vehicle because it depends also on morphological structure of this person's body. The air bag of the 5th-percentile woman has to be deployed if there is an overlapping of a closest child weight class of the Passenger Classification System.

The algorithm of an air bag deployment suppression of the 5th-percentile woman sitting in the contemporary, self-driving, or autonomous vehicle may be prepared on a base of an Artificial Intellect (AI) by employing data including statistics of weather temperature, clothes and shoes weight, time of year, occupant's weight history, etc.

The value of WELF of owners and family members potential victims is registered in dealership at the time of buying a vehicle. A note made in the documents.

The time interval for regular weighing error measuring has to be established for contemporary, self-driving, and autonomous vehicles where the KEF weight measuring technology of an occupant is available.

It is further noted that the aforementioned patents and patent applications incorporated by reference herein, namely U.S. Pat. No. 9,566,877 issued on Feb. 14, 2017, U.S. Pat. No. 10,245,973 issued on Apr. 2, 2019, and U.S. Provisional Application No. 61/956,059 filed on May 30, 2013, can provide a more detailed description of the novel horwest effect and KEF method.

FIG. 1b shows additional occupant's weight classes of one of proposed a Passenger Classification System in this invention Admus adaptive safety SRS system employing the accurate KEF occupant weighing technology. In the FIG. 1b eight weight classes proposed referred to Admus safety SRS system. Among these classes, there are all 5 classes (including children) that exist in the Table S7.1.4 "Weights and dimensions of the vehicle occupants referred to in Standard § 571.208: Occupant crash protection".

Figure 2:
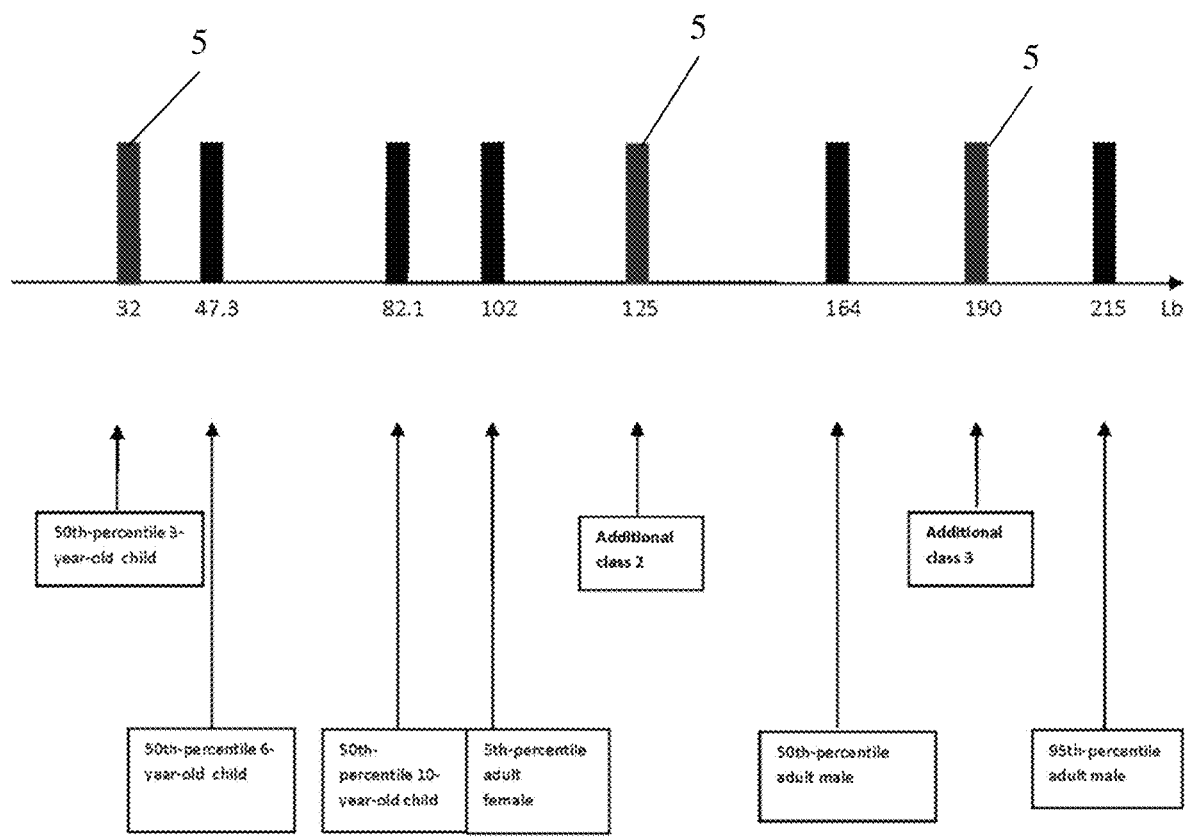
FIG. 2 shows the Table S7.1.4 "Weights and dimensions of the vehicle occupants referred to in Standard § 571.208: Occupant crash protection" with 3 additional weighing classes.

The accuracy of KEF method and elimination of the WELF error, protects weight classes of Admus system from an overlapping that in turn provides room for at least 3 additional weight classes (bars 5 in the FIG. 1b). These additional classes help to solve a problem of applying different forces to the bodies of different weight occupants at the moment of an accident that are controlled through the control signals depending on occupants' weights that are modified depending on the morphological data and factors of the car trip in the current situation that influence the force applied to the occupant's body. For example, (see FIG. 2 and bars 5) the first additional class may be used to gently control a force applied to the 50th-percentile 3-year-old child (for example of 32 Lb weight).

Two other additional classes may be used for the same purposes of applying different forces to the bodies of different (for example 125 and 190 Lb) weight occupants at the moment of an accident that are controlled through the control signals depending on their accurately measured weights and factors of the car trip in the current situation.

Everything shown above in FIG. 2 proposed Passenger Classification System based on accurate occupant's weight measuring KEF method and based in turn on this method the KEF technology provide more accurate differentiation of different weight occupants and a safer restraint system.

Figure 3:
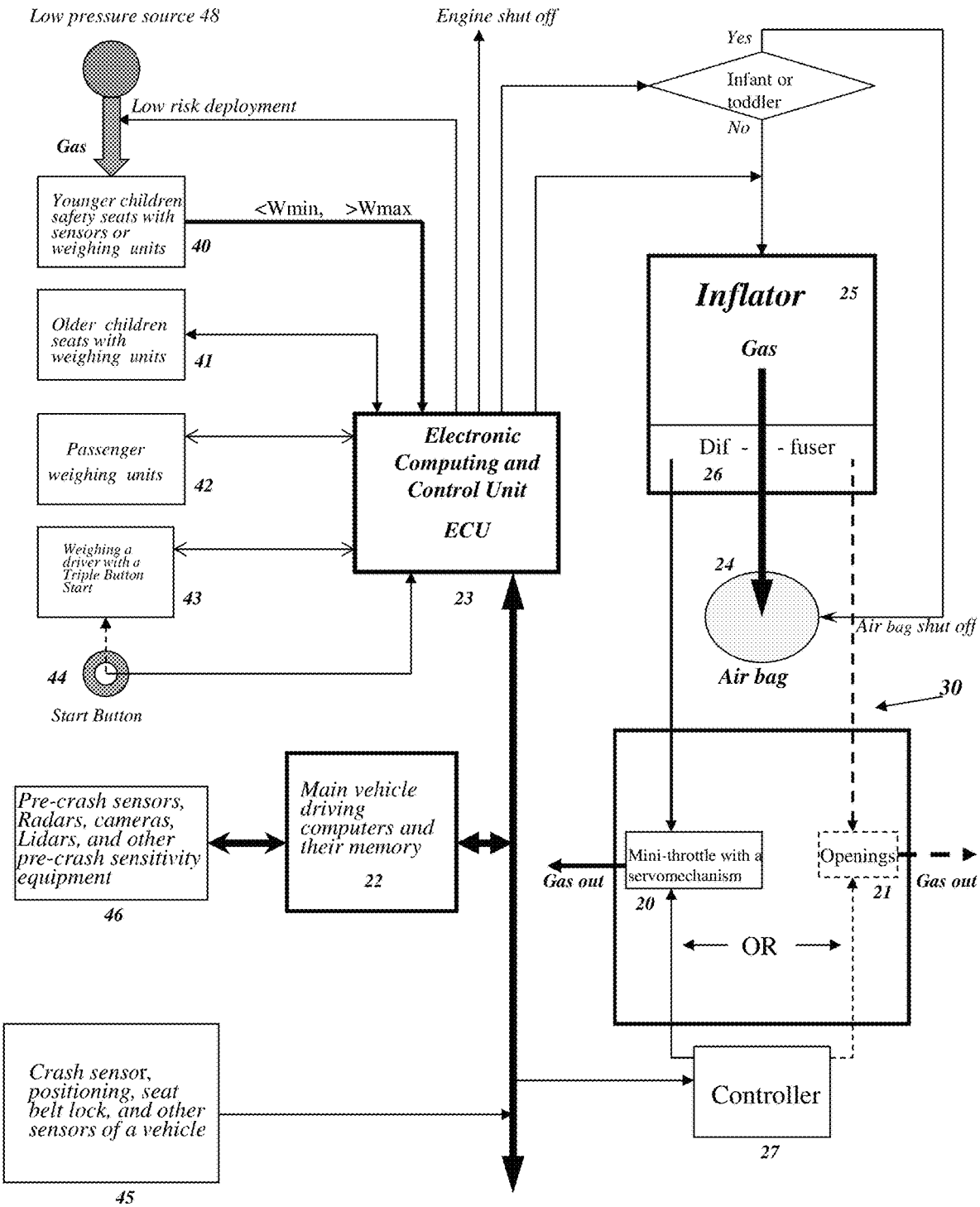
FIG. 3 schematically illustrates a structure of Adaptive multi-force safety system (ADMUS) of the present invention.

In another embodiment of the present invention, a structure of Adaptive multi-force safety system (ADMUS) of the present invention is shown in FIG. 3.

ADMUS consists of younger children, including infants and toddler, safety seat 40 with weighing unit, older children seat 41 with weighing unit, passenger seat 42 with weighing unit, a driver seat 43 with a weighing unit. The employment of a weighing unit in the smart seat of younger children is provided because of publication results of casualties in crashes of the passenger vehicles in 2016 [19].

In Table 2 of [19], is provided by age groups and restraint devices use, the number of passenger vehicles occupants that have been killed in crashes in 2016. The ratio of the number of restrained passengers to the number of unrestrained passengers killed in the younger age groups such as <4 years old and 4-7 years old, and in the older aged groups 65-74 and 75+ years old passengers, is 2-3 times higher than in other age groups. Besides that, the percentage of known restrained was higher than the percentage of known unrestrained people killed in 2016. One the problems may be the lack of force and energy of young children and old passengers to overcome the consequences of a vehicle crash or by a negative influence of a restraint device on a weak body.

So, it seems that the younger children group needs a gentle restraint support during a possible crash. To provide this feature, the modification ADMUS-M of the ADMUS system is proposed that consists of younger children safety seat 40 with a low gas pressure source 48 and weighing unit. The electronic computing and control unit ECU 23 analyzes several critical levels of evaluating young children's weight: when the seat is empty, weight of the child before final accommodation of a child in the seat, and when the measured weight on the seat is more than allowed weight for a child in this weight category. The electronic computing and control unit 23 will send a warning to a driver in the last case. The structure of the seat 41 for older children is analogical to the seat 40. Passengers and children of 41 and 42 whose feet touch the floor of a vehicle when they are seating in the car, use the KEF method and technology of measuring their weights.

In another embodiment of the present invention, the ADMUS system provides the Button Start 44 for starting the vehicle engine and weighing the driver by the Triple Button Start (TRIBS) method at the start of the vehicle.

In another embodiment of the present invention, the Admus safety system provides safety protection of the different weight occupants by extracting a part of the gas generated by the inflator in case of collision to outside air. There are several methods to do it. In FIG. 3 are shown two of these possibilities: by a mini-throttle 20 (shown by solid lines) or by controlled openings 21 (shown by dashed lines). In FIG. 3 the ADMUS system employs the main vehicle computer 22 and their memory, electronic computing and control unit 23 that monitors and controls an on-board vehicle occupant restraint air bag system 30, consisting inflator 25 with diffuser 26, which connects inflator with the air bag 24 (shown only one air bag for older children or adult).

In one embodiment of the present invention in FIG. 3, a throttle-type control unit is employed to remove a part of the gas moving from inflator to the air bag to atmosphere. This device is analogous to a regular automobile throttle, but works in the opposite direction, and is called a mini-throttle 20. The input substance of the mini-throttle is a hot gas generated in the inflator that goes through the mini-throttle to the outside atmosphere. The mini-throttle moves part of the gas from the inflator to the outside atmosphere and may be rotated up to a 90° angle by a servomechanism or servo (not shown in FIG. 3) having a metal gear. The servomechanism or servo is controlled by the output signal of a supplemental controller 27 depending on the type of the servomechanism and the original weight of the vehicle occupant modified by other related signals of the trip at the time of an accident. The appropriate servo may be found in the servo data base ServoDatabase.com.

In another embodiment of the present invention FIG. 3, a certain part of the gas generated by the inflator of the proposed system in case of collision is extracted to outside air not by the mini-throttle 20, but by the openings 21 located in the diffuser that connects the inflator and air bag and is controlled by the controller unit 27. For the heaviest occupant and the severest crash and the worst morphological position of the occupant and driving factors of the car trip situation, none of the openings will be open, and the whole volume of the gas produced by the inflator will apply the maximum force to the body of the occupant through the air bag.

In another embodiment of the present invention FIG. 3, other sensors such as crash sensor, positioning sensor, seat belt lock sensor, that are used in the Supplemental Restraint Systems of the contemporary and self-driving or autonomous vehicles, are shown as 45.

In another embodiment of the present invention, an additional safety feature for the infants, toddlers, and younger children is used. Despite the standard recommendations of putting younger children in a rear-facing back seat, there are a lot of injures of younger children during imminent crashes. To make imminent crash consequences less dangerous for them, a mixed structure of the Adaptive multi-force safety system—ADMUS-M is proposed for contemporary, self-driving, and autonomous vehicles. In ADMUS-M restraint safety system, the addition to the children's smart seat a source of the gas restraint energy in a separate container 48 for the infants and younger children is employed. This is not a pyrotechnical gas like those for older children and adult occupants, but a lower pressure neutral gas in a small container.

The gas container and restraint are located in the seat back of the car seat in front of a car seat on which the infant's or small child's smart seat is assembled. This child seat has to have some space to move in case of crash, and a calculation of its restraint may be made by using an accurate weight of the child made at the beginning of a trip and measured speed of a vehicle at the moment of crash.

It makes the restraint system for infants and younger children safer than a pyrotechnical restraint system and provides a low risk deployment of a child restraint. It is shown in Table 6, the groups of infants and 3-years-old children may be divided by 3 weight classification categories each. The values of the weight of these 6 empty categories for the infants and 3-years-old children may be provided. The air bags for younger children up to 4 years old (before the boosters will be used), especially for infants and toddlers, must be special forms and need time for experiments to avoid casualties. The gas controller in the mixed ADMUS-M for infants and younger children satisfies the Table S7.1.4 "Weights and dimensions of the vehicle occupants referred to in Standard § 571.208: Occupant crash protection".

The smart infant's and toddler's car seats may be connected to the vehicle through a frontal spring. The gas from the restraint container may press both the smart child car seat and child's body (Double Action—DA), The gas can only be released from container while the small child seat is fixed properly in the vehicle. A separate microcontroller controls the gas coming to each child's restraint device and that makes the Adaptive multi-force safety system—ADMUS-M—more gentle for infants and younger children, provides deployment of a restraint with a low risk, and may simplify the requirements to position of the younger children seats.

The sensors for measuring an infant's and younger child's weight in ADMUS-M restraint safety system are located in children's removable attachable seats. In this mixed structure of the present invention, the Adaptive multi-force safety system—ADMUS-M, the accurate KEF weight measuring technology of an occupant is used for weighing older children and adult occupants according to the Table S7.1.4 "Weights and dimensions of the vehicle occupants referred to in Standard § 571.208: Occupant crash protection" to eliminate an error in the weight measurement because their feet touch the floor or pedals when these types of occupants are sitting in their seats.

In two other embodiments of the present invention in Table 6, the mixed structures of the Adaptive multi-force safety systems—ADMUS-M1 and ADMUS-M2—are proposed. The number of calibration points is increased for infants and younger children (in ADMUS-M1) and for both infants and younger children and for older children and adult occupants (in ADMUS-M2) for purposes of improving accuracy of the restraint systems and for more gently applying restraint force to an occupant's body to decrease injuries in case of collision according to its weight.

The descriptions in the further text are related to all modifications of ADMUS and ADMUS-M if not specified.

To predict and discover a possible imminent crash situation during a regular trip, the ADMUS systems for self-driving or autonomous vehicles include crash predicting equipment such as, but not restricted by crash sensor, occupant weight sensor, positioning sensor, seat belt lock sensor, and possibly other sensors. The system employs constantly during the trip the data from radar, cameras, lidar, and also other pre-crash sensitivity equipment 46. The ADMUS system has the following steps of work: regular monitoring of sensors, receiving from computers accurate coordinates and time of predicted imminent collision with another object on the road, size and speed of this object, etc.

Figure 4:
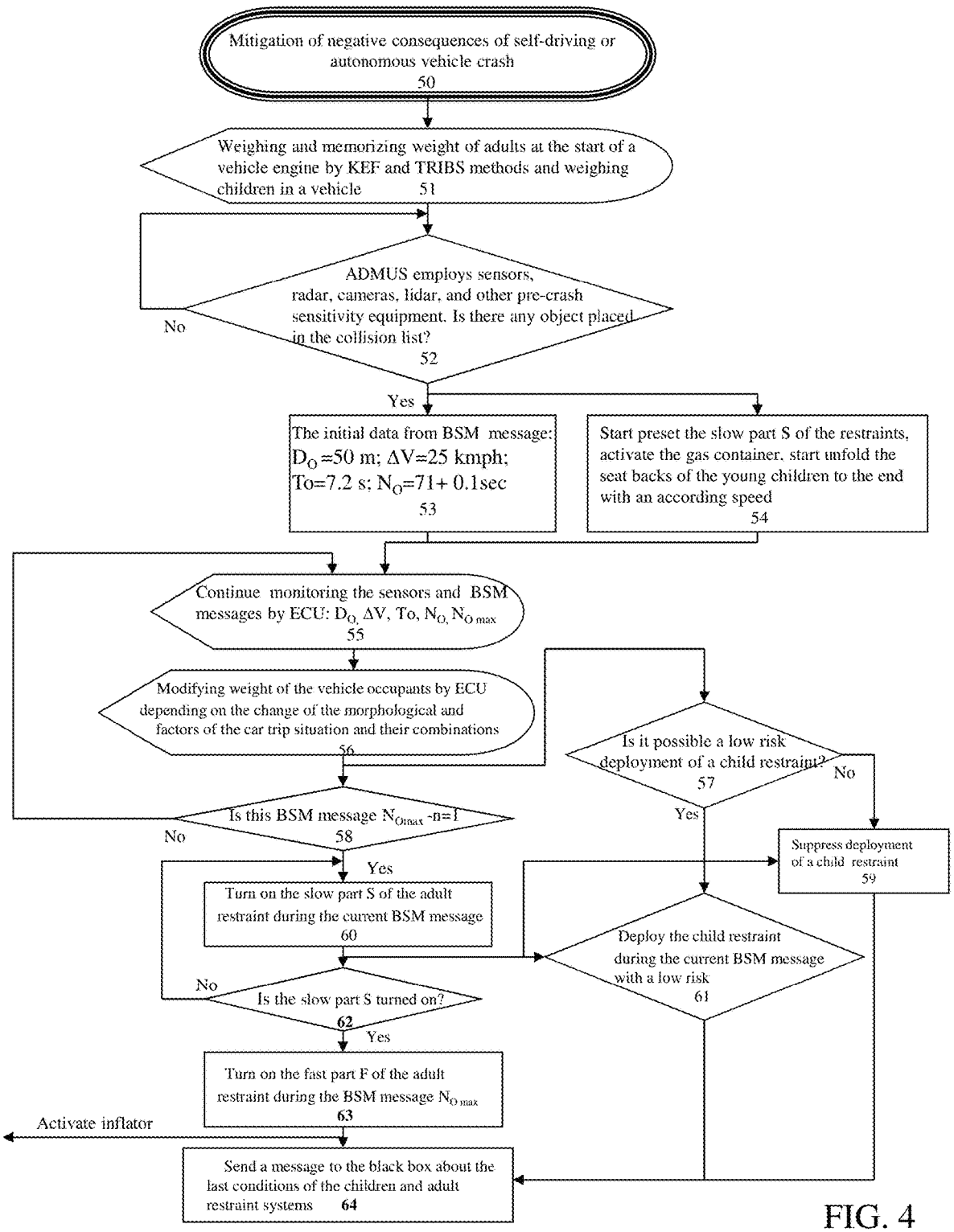
FIG. 4 is a flow chart illustrating an algorithm of the present invention.

In FIG. 4 is presented the algorithm 50 of mitigation of negative consequences of self-driving or autonomous vehicle crash. The Admus weighs and memorizes weight of passengers to whose car seat a weighing unit is attached by KEF technology at the start of a vehicle trip in 51. The driver may be accurately and conveniently weighed also at the start of a vehicle engine at point 51 by the TRIBS method, and his/her weight will be memorized in ECU. ADMUS employs in 52 main computer that use the sensors, radar, cameras, and other pre-crash sensitivity equipment to find out the existence on the road of any possible object that may be an obstacle and a reason for an imminent collision on the

TABLE 6

| | | Classification | | | | | | | | | | | | | | | |
|---|---|---|---|---|---|---|---|---|---|---|---|---|---|---|---|---|---|
| | | Low level weight (Lb) | | | | | | | | High level weight (Lb) | | | | | | | |
| No | Structure | 0 | 1 | 2 | 3 | 4 | 5 | 6 | 7 | 0 | 1 | 2 | 3 | 4 | 5 | 6 | 7 |
| 1. | ADMUS-M Weighing technology | Empty-seat | Infant | | | 3-years-old | | | 6-9-years-old 47.3 Short legs Long legs | 10-years-old 82.1 | 5-percentile women 102 | | | 50-percentile male 164 | | | 95-percentile male 215 |
| | | | | Contemporary | | | | | | | | | KEF | | | | | |
| 2. | ADMUS-M1 Weighing technology | 0-5 | 10 | 15 | 20 | 25 | 30 | 35 | 40  50 | 82.1 | 102 | | | 164 | | | 215 |
| | | | Contemporary Linear controller | | | | | | | | | | KEF | | | | | |
| 3. | ADMUS-M2 Weighing technology | 0-5 | 10 | 15 | 20 | 25 | 30 | 35 | 40  50 | 75 | 100 | 125 | 150 | 175 | | 200 | 225 |
| | | | Contemporary Linear controller | | | | | | | | | KEF linear controller | | | | | | |

In another embodiment of the present invention, an onboard vehicle ADMUS-M or ADMUS system provides an accurate occupant weighing by KEF method based on a horwest (horizontal weighing stability) effect to providing predicting, preventing and treatment the illnesses, including the kidney disorders, during which multiple times accurate weight function measurement in a vehicle may be made without a person hospitalization.

road every Basic Safety Message (BSM) Communication Frequency (Pre-Crash scan mode) with F=10 times per second in our case. The Admus asks the main computer in the 52 if there is an obstacle on the road that may cause an imminent collision. If there is no object placed in the collision list during the Pre-Crash scanning, the ADMUS returns to the point 52 and continues monitoring a possible collision. In case the main computer placed any object in the collision list during the Pre-Crash scanning at point 52, ADMUS requires and receives in 53 the initial information about an obstacle on the road that may cause an imminent collision.

Assume the restraint for adult of the ADMUS system consists of two parts:

reusable, slow electromechanical part S. This part changes the capacity of the hot gas that comes from inflator to the air bags of older children and adults depending on weight and position of a vehicle occupant and a trip situation or from the gas container for infant and toddler;

fast part F that is a valve or any switchable turn on/off gas connector. The fast part F may be electromechanical and reusable.

To improve timing and, accordingly, safety of the restraint unit, the Admus provides immediate preset of the part S of the restraint unit if the pre-crash sensitivity equipment places any object on the road in the collision list. In the preset position, part S receives a signal from the controller 27 (FIG. 3) that puts it in the middle position of its rotation range. This method twice decreases the time of a possible needed rotation from one side to the other side of the part S in case of collision.

The speed of servomechanisms is different and may be in range 0.03 s/60° to 0.5 s/60° depending on the modulation type, size, torque, price, etc. Assume that part S of Admus employs the digital servo of company Multiplex model Profi Speed BB. This model has speed of 0.15 s/60° and rotation range 90°.

Assume that an object on the road was captured and placed in an object list during the trip by the Pre-Crash scanning equipment. According to the Table 2, the vehicle may have the imminent crash with this object on the road in $T_O$=7.2 seconds if the pre-crash speed $\Delta V$ of the vehicle was 25 kmph (see column 1 of Table 2), the initial distance Do between the vehicle and another object was 50 meters, and that crash will happen in 100 milliseconds after the 71 times BSM messages sent or after 71 times Pre-Crash scanning repeated with frequency F=10 times per second.

Simultaneously, the ECU (At the same time, the ECU begins to preset the slower part S of the restraint system for adults and lower the seat backs of the young children in a substantial horizontal position at a corresponding speed of 54) starts to preset the slow part S of the adult restraint and unfold the seat backs of the young children to the end with an according speed in 54. The ECU will continue to receive and analyze updated values of $D_O$, $\Delta V$, To, No every such time interval in 55. Other parameters are possible to receive also. The ECU in 56 is modifying original weight of the vehicle occupants depending on the change of the morphological and factors of the car trip situation and their combinations. By receiving regular data about current conditions of the trip, ADMUS in 55,56,57, 58 solves a problem of subsequently suppressing (57, 59) or deploying (57, 61) of a child restraint with a low risk at a penultimate BSM message before the imminent crash (58).

The preset of part S of AMUS to position 45° will be made by the digital servo of company Multiplex model Profi Speed BB at point 54 of FIG. 4 approximately in 0.113 sec and will be completed in a couple of BSM messages.

At the same time, the ECU begins to preset the slower part S of the restraint system for adults and lower the seat backs of the young children in a substantial horizontal position at a corresponding speed of 54.

Assume that the $S_{pre}$ is a time of preset of part S. For the servo of company Multiplex model Profi Speed BB the preset time is longer than time interval of one BSM message or longer a time interval of one Pre-Crash scanning. $S_{pre}$ has to be <nB, where B is the time interval of one BSM message or a time interval of one Pre-Crash scanning, and n is a whole number and in case of model Profi Speed BB the value n=2.

If we may assume that speed of the model Profi Speed BB is the same value in the whole range from 0 to 90° rotation, the same time interval $S_{on}$<nB, it is necessary to turn on part S of the servo model Profi Speed BB after it was preset because the maximum possible angle of rotation after preset is 45°. It means that part S has to be turned on at least n=2 time intervals of BSM messages earlier than part F of the restraint in case of employing servo model Profi Speed BB.

In case of using servo Futaba BLS251SB for the part S, the speed is 0.06 s/60° and rotation range 90°, $S_{pre}$=0.045 sec<nB=1*0.1 sec<1 BSM message;
$S_{on\ max}$=0.045 sec<nB=1*0.1 sec<1 BSM message.

If in our case according to the Table 2, the vehicle will have the imminent crash with the object on the road in $T_O$=7.2 seconds, the number of BSM messages at point 58 will turn on the slow part S of the adult restraint at point 60 at least before nB sec the imminent crash will happen. ADMUS checks this situation in 62 and turns on the fast part F of the adult restraint and activates inflator at point 63. Inflator will generate gas after the valve of the fast part F of the adult restraint will be turned on because the turn on time $F_{on}$ of the fast part F (<0.050 sec) of the adult restraint is less than activation time of the inflator.

The black box of ADMUS receives in 64 information about the conditions of the children and adult restraint devices.

As was mentioned above, in Table 2 of [19] is provided by age groups and restraint devices use, the number of passenger vehicles occupants that have been killed in crashes in 2016. The ratio of the number of restrained to the number of unrestrained killed in the younger up to 7 years age old group is 2-3 times higher than in other age group. Besides that, the percentage of restrained in this group was higher than the percentage of unrestrained killed. One the problem may be the lack of force and energy of young children to overcome the consequences of a vehicle crash or by a negative influence of a restraint device on a weak body.

To help in this case, the position of youngsters in the seat just before the imminent crash in self-driving or autonomous vehicle is better when changed from sitting to substantially horizontal with a speed calculated according to the distance to the object on the road and occupant safety purposes.

If the child is seated in a child car seat facing backward, then the back of this child car seat must recline completely to the end with an according speed before an imminent collision.

If the child is seated in a child car seat facing forward, then both the back of the used car seat together with a light child's seat back must recline completely to the end with an according speed before an imminent collision.

To decrease a pressure on weak children's body at crash, a frontal spring is used between the front part of seat and child's feet. It seems that younger children group needs a gentle restraint support during a possible crash. Also, to provide this feature, the proposed ADMUS consists of young children safety seat 40 with a low gas pressure source 48 and weighing unit.

So, accurately weighing occupants by employing the KEF method and continuously and accurately monitoring the pre-crash timing of the imminent crash, the ADMUS system provides higher protection of the different weight occupant bodies from the extra force applied to them in case of accident by extensive preparations for overcoming an imminent vehicle collision on the road and preventing fatal accidents as well as injuries of the occupants that may be caused by an unsafe force applied to their bodies by the restraint system in the event of a collision.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the described features.

REFERENCES

1. U.S. Pat. No. 5,564,743.
2. Notice of Proposed Rulemaking. DOT of transportation NHTSA. 49 CFR Part 571 [Docket No. NHTSA-2016-0126] RIN 2127-AL55 NHTSA 2016
3. NHTSA. "Driver assistance technologies". January 2018
4. The Race for Self-Driving Cars. By Guilbert Gates New York Times, Jun. 6, 2017 5. General Motors, Gazing at Future, Invests $500 Million in Lyft. By MIKE ISAACJAN. 4, 2016. New York Times.
6. Volvo's autonomous Drive Me project kicks off in Sweden. ROAD/SHOW. CAR INDUSTRY, by Andrew Krok. Sep. 12, 2016
7. Autoliv staffs up for leap into autonomous. Big move starts with an engineer surge. Automotive News. by David Sedgwick. Sep. 19, 2016
8. Qualcomm to Acquire NXP Semiconductors for $38.5 Billion, By CHAD BRAY and QUENTIN HARDY. New York Times. Oct. 27, 2016
9 At CES (Consumer Electronics Show) 2018, Ford launches a cloud-based platform for mobility services and announces collaboration with Qualcomm on C-V2X by Teena Maddox, Jan. 9, 2018.
10. NHTSA. "A Notice of Proposed Rulemaking (NPRM) in 2016. 49 CFR Part 571 [Docket No. NHTSA-2016-0126] RIN 2127-AL55 Federal Motor Vehicle Safety Standards.
11. Tesla's Autopilot: The smart person's guide. By Hope Reese, TechRepublic, Aug. 4, 2017.
12. Waymo Safety Report. On the Road to Fully Self-Driving. 2017
13. C-V2X offers a cellular alternative to IEEE 802.11p/DSRC, by Sam Lucero Senior Principal Analyst, M2M and IoT. Jun. 9, 2016
14. Consumer Electronic Show. Press release. 3GPP Release 14 Cellular-V2X Technology Field Trial in Germany. Jan. 3, 2017 LAS VEGAS.
15. Pre-crash sensing countermeasures and benefits, by Ron Pack, Jonathan Koopmann, Hailing Yu, Wassim G. Najm. Proceedings of the 19th Conference ESV 2005. Paper Number 05-0202.
16. Pre-crash Sensing—Functional Evolution based on Short Range Radar Sensor Platform, by Rainer Moritz, Robert Bosch Gmbh. Copyright © 2000 Society of Automotive Engineers, Inc. 00IBECD-11
17. Development of occupant classification system. Tsutomu Takano, Nissan Motor Co., LTD 18 International ESV conference, Nagoya, May, 2003 Paper Number 206.
18. U.S. Pat. No. 7,330,784
19. Traffic safety facts. 2016 data. DOT HS 812494. February 2018. NHTSA.
20. U.S. Pat. No. 9,566,877
21. U.S. Pat. No. 10,245,973
22. U.S. Pat. No. 10,017,078
23. U.S. Pat. No. 10,131,308

What is claimed is:

1. An on-board vehicle adaptive multi-force safety mixed system, comprising:
    an electronic computing and control unit connected to vehicle internal sensors and to a vehicle main computer, the vehicle main computer being connected to crash sensing related sensors and vehicle driving sensors;
    occupant weighing devices connected to seats of passengers which are operatively connected to inflators through controllers which are connected to the electronic computing and control unit, the occupant weighing devices are configured to weigh an occupant when the occupant provides a force in a horizontal direction of a predetermined value to a vertical surface of a vehicle and the occupant simultaneously lifts their feet above a floor of the vehicle when the occupant's weight is measured by at least one of the occupant weighing devices, and wherein a restraint power line of an air bag of a child seat is connected to a non-pyrotechnical air bag source configured for use with the child seat, the non-pyrotechnical air bag source is connected to and controlled by the electronic computing and control unit.

2. The on-board vehicle adaptive multi-force safety mixed system as in claim 1, wherein a variable weight loss of the occupant equals to a ratio of weight measurement of the occupant prior to the occupant being fastened to a seat of the vehicle by a seat belt, and prior to the occupant's original weight measured when the occupant provides a force in the horizontal direction of the predetermined value to the vertical surface of the vehicle and the occupant simultaneously lifts their feet above the floor of the vehicle.

3. An on-board vehicle adaptive multi-force safety mixed system as in claim 2, wherein the electronic computing and control unit is connected to a seat of a driver of the vehicle, and the restraint power line of the air bag is controlled by the electronic computing and control unit, wherein a variable weight loss of the driver depends on a position of the driver's feet and equals to a ratio of weight measurement of the driver prior to the driver being fastened to the seat of the driver by a seat belt and prior to the driver's original weight measured when the driver provides a force in the horizontal direction of the predetermined value to the vertical surface of the vehicle and the driver simultaneously lifts their feet above the floor of the vehicle.

4. A method for mitigation of negative consequences in an imminent vehicle crash and enhancing safety of vehicle occupants, comprising:
    weighing and memorizing weight of passengers and a driver by of a vehicle employing the on-board vehicle adaptive multi-force safety mixed system of claim 1 at the start of an engine of the vehicle by pushing a button;
    employing data processed and analyzed by the main computer of the vehicle collected from internal and outside sensors, radar, and cameras to get a warning that there is a potential collision;
    monitoring trip data to receive data from the main computer about coordinates and time of the potential collision;
    starting to preset parts of restraints of the vehicle;
    presetting a children restraint gas container;

wherein if a child is seated in a child car seat fixed on a vehicle seat facing backwards, then a back of the child seat must recline on the car seat completely to an end with a speed calculated by the main computer or the electronic computing and control unit before the potential collision;

wherein if the child is seated in the child car seat facing forward, then both the back of the car seat on which the child seat is fixed together with a seat back of the child seat must recline completely to an end with a speed calculated by the main computer or the electronic computing and control unit before the potential collision;

modifying weight of occupants of the vehicle by the electronic computing and control unit depending on a change of both morphological factors and factors of a trip of the vehicle and their combinations to control the force applied to bodies of the occupants of the vehicle before the potential collision according to an occupant classification system;

wherein if a current modification of the adaptive multi-force safety mixed system provides a deployment of a child restraint, allowing in a corresponding following step deployment of the child restraint, wherein if a current modification of the adaptive multi-force safety mixed system does not provide a deployment of the child restraint there is a suppression of a deployment of the child restraint;

deploying the child restraint with a low risk at a penultimate message before the potential collision predicted by main computer;

turning on a first part of an adult restraint;

turning on a second part of an adult restraint and activating an inflator; and sending a message to a black box about a last condition of the child restraint and the adult restraint.

5. The method as in the claim 4, wherein in a time interval $T_{start}$ after the engine of the vehicle has been started, a timer disconnects the button from a driver weighing line, and the button begins to work only for an engine line.

6. The method as in claim 4, wherein the weighing further comprises:
A. providing by a passenger a physical force to move their body in their seat by:
  pushing horizontally on a vertical stationary part of the vehicle; and
  moving up their feet from a floor or/and pedals of the vehicle;
B. providing a signal to the main computer to measure and memorize a weight of the passenger, who is sitting in their car seat with their feet moved up from the floor or/and pedals, by:
  sending a signal to the main computer while pushing horizontally a pushbutton or switch fixed on another stationary part of the vehicle by the passenger or;
  sending a voice command to the main computer to start to measure and memorize the weight of the passenger sitting in their car seat simultaneously during step A; and
  monitoring a weight of the passenger before, during, and after the step A to determine if a calculated weight of the passenger is more than 15% of a predicted weight;
C. determining an accurate occupant weight measurement after steps A and B.

7. A method as in claim 4, wherein pushing the button by an occupant in the driver's seat of the vehicle provides the following steps:
1) starting the engine of the vehicle by sending a signal to the electronic computing and control unit;
2) weighing an occupant who is in a driver's seat when the occupant provides a force in the horizontal direction of the predetermined value to the vertical surface of the vehicle and the occupant simultaneously lifts their feet above the floor of the vehicle;
3) protecting the vehicle if a child is trying to drive it by sending a signal to the vehicle main computer to start the driver seat occupant's weight measurement and if the occupant in the driver's seat has a weight less than a weight corresponding to an adult, the vehicle main computer suppresses an ignition of the engine of the vehicle and sends a warning message to a control panel or if the weight of the occupant in the driver's seat is equal or higher than the weight corresponding to an adult, the vehicle main computer completes starting the engine of the vehicle and saves in its memory the weight of the driver of the vehicle.

8. The method as in the claim 4, wherein the on-board vehicle adaptive multi-force safety mixed system extends a number of classes by at least three a current passenger classification system employing the occupant weighing devices connected to the seats of the passengers.

9. The method as in the claim 4, wherein the on-board vehicle adaptive multi-force safety mixed system provides a driver class in a weight classification system for safety purposes of a person in a driver's seat by measuring of a weight of a person in a driver's seat in a regular, self-driving, or autonomous vehicle when the person provides a force in the horizontal direction of the predetermined value to the vertical surface of a vehicle and the person simultaneously lifts their feet above a floor of the vehicle when the person's weight is measured by at least one of the occupant weighing devices.

10. The method as in the claim 4, wherein the on-board vehicle mixed adaptive multi-force safety mixed system provides a timing presetting an accurate measurement and timing adjustment of different parts of the safety system to prevent occupants of a self-driving/autonomous vehicle from fatalities and injuries in case of collision on a road by the following steps:
preparing for overcoming an imminent vehicle collision by weighing the occupant when the occupant provides a force in the horizontal direction of the predetermined value to the vertical surface of a vehicle and the occupant simultaneously lifts their feet above a floor of the vehicle when the occupant's weight is measured by at least one of the occupant weighing devices;
presetting of a part of a restraint unit if pre-crash sensitivity equipment places detects a potential collision by putting a slow part of the restraint unit in a middle position of its moving range; and
putting seat backs of children in a lower substantial horizontal position at a corresponding speed by unfolding the seat backs of the children to an end with an according speed if the pre-crash sensitivity equipment places any object on the road in a collision list.

11. The method as in the claim 10 wherein, in case of the vehicle main vehicle computer detecting a potential collision during pre-crash scanning and if there is any infant or toddler on-board, the adaptive multi-force safety mixed system executes the following steps:

changing a position of a child seat back from a vertical to a substantially horizontal before the imminent crash;

calculating a required speed of seat back movement according to a distance to an object corresponding to the potential collision; and changing the position of the child seat back from a vertical to a substantially horizontal position.

12. The on-board vehicle adaptive multi-force safety mixed system as in the claim 1, wherein the adaptive multi-force safety mixed system prevents suppression of an air bag safety system by the following steps:

determining before a beginning of a trip an original weight of the occupant when the occupant provides a force in the horizontal direction of the predetermined value to the vertical surface of a vehicle and the occupant simultaneously lifts their feet above the floor of the vehicle when the occupant's weight is measured by at least one of the occupant weighing devices;

determining before the beginning of the trip a measured weight of the occupant when the occupant is sitting not yet fastened in a car and their feet are resting on the floor or pedals of the car;

determining if a calculated difference between the occupant's measured weight when their feet are resting on a floor or pedals of the car and when their feet are above the floor of the vehicle is more than 20% and a last measured weight overlaps with a child's weight range in a passenger classification system, if so, the vehicle main computer eliminates a possible suppression of a 5th-percentile woman's air bag before an imminent crash during a trip and sends a message to a driver.

13. The method as in the claim 5, wherein an algorithm of an air bag deployment of the 5th-percentile woman sitting in a self-driving/autonomous vehicle is prepared on a base of an artificial intellect by employing data including statistics of weather temperature, clothes and shoes weight, time of year, and occupant's weight history.

14. An on-board vehicle adaptive multi-force safety system for a vehicle, comprising:

occupant weighing devices;

an electronic computing and control unit connected to internal sensors and a vehicle main computer, the vehicle main computer is connected to crash sensing related sensors and to driving sensors of the vehicle, and wherein the electronic computing and control unit uses a method of occupant weighing wherein the occupant weighing devices are configured to weigh an occupant when the occupant provides a force in a horizontal direction of a predetermined value to a vertical surface of the vehicle and the occupant simultaneously lifts their feet above a floor of the vehicle when the occupant's weight is measured by at least one of the occupant weighing devices and a start button feature is operatively connected to the occupant weighing devices which are connected to seats of occupants of the vehicle and inflators are connected to air bags of the inflators through controllers that are connected to the electronic computing and control unit, and a restraint power line of the air bags of each occupant are connected to a pyrotechnical source which is connected to and controlled by the electronic computing and control unit and suppressed by the electronic computing and control unit if a child is in a seat, wherein a variable weight of a vehicle occupant depends on a position of their feet and equals to a ratio of a weight measurement of the vehicle occupant's body, who is not yet raised their feet while sitting in the vehicle, to an original weight of the occupant measured when the occupant provides a force in the horizontal direction of the predetermined value to the vertical surface of a vehicle and the occupant simultaneously lifts their feet above a floor of the vehicle when the occupant's weight is measured by at least one of the occupant weighing devices.

* * * * *